United States Patent
Sanghavi

(10) Patent No.: US 8,826,382 B2
(45) Date of Patent: Sep. 2, 2014

(54) ANTIBOT MECHANISMS OPTIMIZED FOR MOBILE COMPUTING

(75) Inventor: Mehul Kirtikant Sanghavi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/620,595

(22) Filed: Sep. 14, 2012

(65) Prior Publication Data

US 2014/0082694 A1    Mar. 20, 2014

(51) Int. Cl.
*G06F 7/04*    (2006.01)

(52) U.S. Cl.
USPC ........ 726/3; 345/168; 726/6; 726/17; 726/21; 726/27; 713/168

(58) Field of Classification Search
USPC .......... 34/173; 726/3, 17, 6, 21, 27; 386/224; 345/173, 158, 642; 715/863; 713/168; 705/2
See application file for complete search history.

(56) References Cited

U.S. PATENT DOCUMENTS

| | | | | |
|---|---|---|---|---|
| 2008/0052945 A1* | 3/2008 | Matas et al. | | 34/173 |
| 2009/0249476 A1* | 10/2009 | Seacat | | 726/17 |
| 2012/0183270 A1* | 7/2012 | Greenblatt et al. | | 386/224 |
| 2013/0038552 A1* | 2/2013 | Chan et al. | | 345/173 |
| 2013/0222246 A1* | 8/2013 | Booms et al. | | 345/168 |

* cited by examiner

*Primary Examiner* — Brian Shaw
(74) *Attorney, Agent, or Firm* — Womble Carlyle Sandridge & Rice, LLP

(57) ABSTRACT

A method of determining whether a response received from an electronic device is generated by a person or by an automated software. The method receives a set of capabilities of the electronic device for detecting a group of actions that include at least a gesture or a device movement. The method selects a set of actions based on the device capabilities. The method sends a request to the electronic device for performing the set of actions in the plurality of actions. The method, based on a result of the set of actions performed on the electronic device, determining whether the set of actions are performed by a human.

22 Claims, 30 Drawing Sheets

ANTIBOT MECHANISMS OPTIMIZED FOR MOBILE COMPUTING

BACKGROUND

In recent years, the development of the information technology sector has meant that people's day-to-day use of the Internet has continually increased; and the convenience of Internet services has increased in kind. Unfortunately, abusive users such as hackers can exploit these Internet resources for their own purpose by using simulated users or automated bots (also referred to as Internet bots, computer bots, or web robots) that can reduce the performance of online systems for legitimate users.

In order to avoid this situation, it is important to be able to distinguish between valid human users and invalid computer bots on the Internet. Web based content portals and sites requiring any sort of authentication have used the 'CAPTCHA' as a mechanism to differentiate between humans and bots. The test is designed so that human users can answer the questions or challenges easily, but computer-program based imitators face considerably greater challenge in answering the questions using optical readers. By considering the quality or correctness of a response, a judging computer can determine whether the tested user is a human or a computer bot.

In recent years a lot of progress has been made to make the CAPTCHAs harder for bots and yet easier for humans to solve. However there is an inherent flaw with traditional CAPTCHAs. A CAPTCHA that is hard for a bot to crack is also hard for a human to solve. Dial-up the difficulty and both bots and humans fail. Dial down the complexity and the abuse and farmed accounts go up. Difficult CAPTCHAs ultimately lead to user frustration and eventual drop-off from registration forms and other services.

BRIEF SUMMARY

Some embodiments provide a method to ensure a request or response received from an electronic device is generated by a human. The presumptive user of the electronic device is provided by a challenge to perform certain actions that take into account features of user's mobile device such as touchscreen, magnetometer, accelerometer, gyroscope, camera, flash, microphone, and other capabilities. The users are presented with a sequence of actions to perform on the mobile device. The actions are checked for correctness. Some embodiments provide feedback to the user after each action while other embodiments give the feedback after the full sequence is performed.

The sequence is build based on the features available on each device. For instance, if the device includes a magnetometer, one of the actions might use the magnetometer. For example, the sequence might include displaying a compass and asking the user to turn the device to a certain degree. Some embodiments also consider the accuracies provided for each of the device capabilities. For instance, if the device is a later model smartphone, the action might request the user to turn the device to a certain degree. On the other hand, for an older model phone with a less precise magnetometer, the action might request the user to turn the device to within a certain range of degrees or just to point the device, e.g., to northwest.

Some examples of the actions utilized by different embodiments include changing orientation (e.g., from landscape to portrait and vice versa), tilting to a certain degree, shaking the device (e.g., shaking hard), changing direction (e.g., turning the device to a certain direction), performing different touch-based gestures, activating different device application, etc. A touch-based gesture is performed when the user touches one or more points on a touch sensitive surface such as a touchscreen, a touchpad, etc. The touch-based gestures include swiping, tapping (any number of taps), tapping and holding (or long press), scrolling up or down, pinching in, pinching out (or spreading), flicking, sliding, rotating (or moving fingers in opposite directions), panning or dragging, nudging, etc. Some embodiments specify different rates or speeds (e.g., slow or fast), different directions (e.g., left, right, up, down, diagonal), and/or different patterns (e.g., different number or different locations of touch points) to be used for each gesture. For instance, swipe fast to the left with one finger or swipe to the right, swipe vertical with four fingers, etc. Application activations include activating camera and taking a picture, activating the camera and flash and taking a picture, recording a loud voice using the microphone, etc.

A similar method is utilized by some embodiments to authenticate a user for accessing an account or a service by performing a pre-determined sequence of actions including device movements, gestures, and/or application activations. Based on the capabilities of different devices that a user might utilize to access the account or service, the user is guided to select a sequence of actions to gain access much like the same way as a password is used to authenticate a user. The sequence of actions is used in some embodiments along with a user or account identification to provide access. Some embodiments allow the user to choose the number of actions, their complexities, and accuracies based on the amount of security and protection that the user wants and/or the requested account or service requires.

Some embodiments utilize one or more actions to identify a user from a group of users that share a device. For instance, when a group of users are using the same device to take tests, learn lessons, read books, watch movies, or play a game, each user is identified by performing a quick sequence of one or more actions. For instance one user is identified by a tap followed by a swipe to left while another user is identified by turning the device to 255 degrees, etc. In this way, each users starts from where the user had left without having lost the scores or having to reset or rewind any content.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
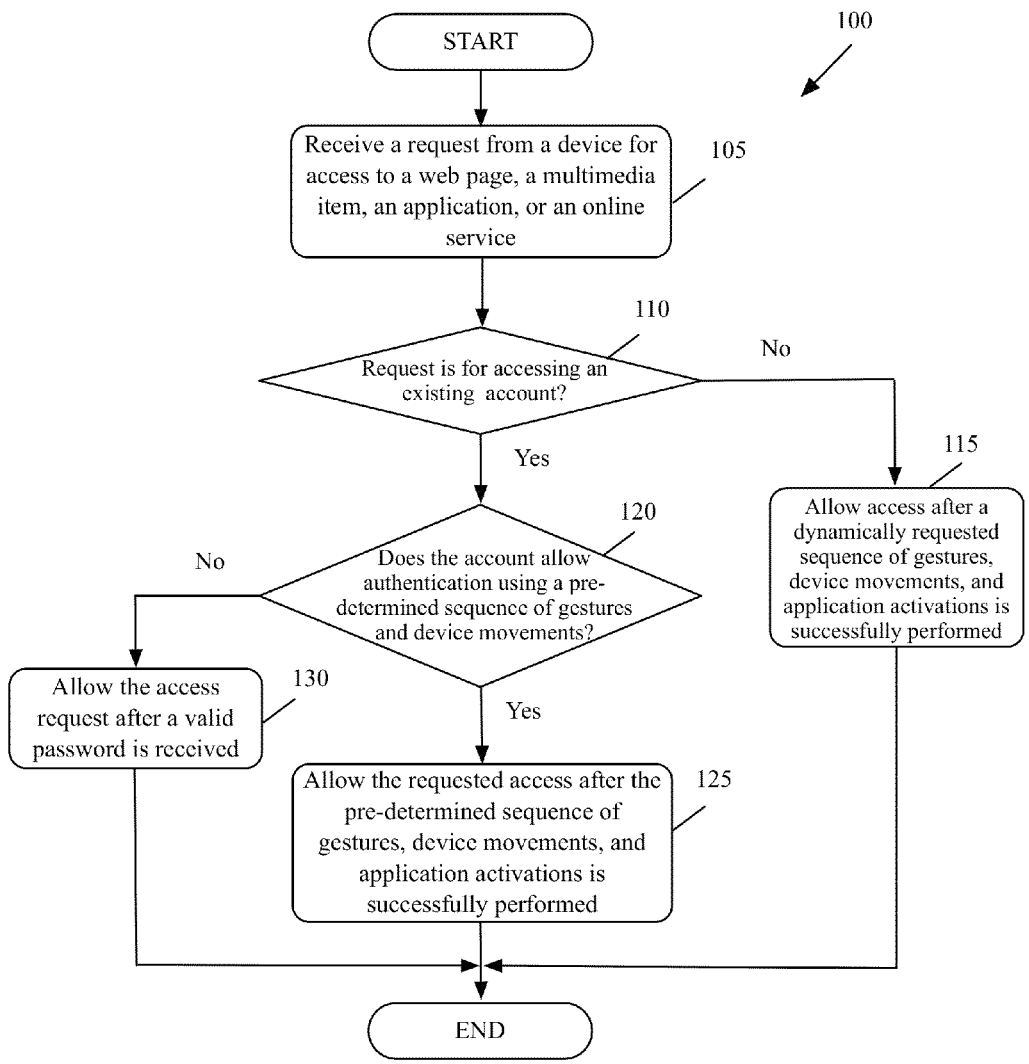
FIG. 1 conceptually illustrates a process for allowing access to a web page, a multimedia item, an application, or an online service in some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Despite enormous progress made on the CAPTCHA front, the CAPTCHA format of jumbled letters or other signage such as image puzzles has stayed the same for desktop computers and mobile computing. CAPTCHAs designed for users using desktop based browsing give higher level of affordance for corrections, which are not typically possible for mobile users.

Mobile phones do have the advantage that their users are typically authenticated by a known carrier and therefore technology can be build to directly authenticate the user into a desired site or service. However, there will be privacy concerns with this approach and some services may not want the user's carrier registered information. Thus CAPTCHAs will be required for the foreseeable future.

To make CAPTCHAs easier to answer, some embodiments of the invention take into account smart phone features that are now becoming standard across the various platforms and which are extremely difficult to emulate by abusers without access to sophisticated technologies and mechanisms. These features would also account for ease of use from a user perspective. While the overall enhancements in CAPTCHAs has helped, some embodiments provide a better CAPTCHA experience for mobile computing and smart phones which utilizes the new features available and are optimized for smaller screen size and the potential lack of physical keyboard. The CAPTCHA in some embodiments leverages only the features available to the user's mobile hardware. Users therefore will find solving the CAPTCHAs a fun exercise that keeps them engaged and lessens user frustrations and drop-offs.

As described further below, CAPTCHA complexity is dialed up or down in some embodiments by simply adding or removing sequence actions or by adding or removing complex gestures. Since action-based CAPTCHAs do not require recognizing the meaning of words, the disclosed CAPTCHAs are language agnostic and do not pose difficulty for non-English speakers as word-based CAPTCHAs currently do.

Some embodiments maintain a device capability matrix. The gestures, device movements, and application activations required to pass a CAPTCHA challenge in these embodiments are different for different devices. The users are therefore presented with different types of actions on different devices. The CAPTCHA offering sites can offer different variants of the CAPTCHA and have flexibility to have different control levels per device/platform.

Some embodiments utilize combinations of gesture, device movement, and application activation actions like a password in order to authorize user access to an account, an application, a service, or a resource. For instance, the combination of actions is used in some embodiments as an application-based passcode in order to unlock applications and application content.

The ability to increase or decrease the complexity of the CAPTCHA action sequence provides the ability for a site requiring CAPTCHA to dial-up or dial-down the complexity of the sequence in order to keep the CAPTCHAS user friendly and yet provide sufficient amount of deterrent to bot-based abuse. Similarly, in embodiments that utilize sequence of actions as passcode, different applications can use different action sequences and the user can have different levels of security with each application by choosing a more complex sequence of actions for an increased security and vice versa.

Several more detailed embodiments of the invention are described in sections below. Section I describes utilizing gestures and device movements to distinguish human from automated robots in some embodiments. Next, Section II describes utilizing gestures and device movements to authenticate users in some embodiments. Section III describes identifying a user from a group of users of an application by utilizing gestures and device movements in some embodiments. Finally, a description of an electronic system with which some embodiments of the invention are implemented is provided in Section IV.

I. Utilizing Gestures, Device Movements, and Application Activations to Distinguish Human Users from Automated Robots Some embodiments utilize a sequence of user-entered gestures, device movements, and application activations to allow access to web pages, remote applications, etc. The sequence is also utilized in some embodiments as a password to allow access to a user account.

FIG. 1 conceptually illustrates a process 100 for allowing access to a web page, a multimedia item, an application, or an online service in some embodiments of the invention. The figure shows the high level operations used for allowing such an access. The details of each operation are given in the following sections. As shown, the process receives (at 105) a request from a device for access to a web page, an application, or an online service. For instance, the process receives such a request when a user of the device selects a link to open a web page or to run an application. Alternatively, the process receives such a request when an Internet bot activates the same link to automatically gain access to information.

The process then determines (at 110) whether the request is to access an existing account. For instance, the process determines whether the request is to log in as a user of an account. If the request is not for accessing an existing account, the process allows (at 115) the requested access only after a sequence of gestures, device movements, and/or application activation is successfully performed. The process then exits. Otherwise, the process determines (at 120) whether the account allows authentication after a pre-determined sequence of gestures, device movements, and/or application activation is performed. For instance, when the user of the account has selected a particular sequence as a password to gain access to the account. If yes, the process allows (at 125) access after the pre-determined sequence is successfully performed. The process then exits.

Otherwise, when the account does not allow the use of gestures and device movements for authentication, the process allows (at 130) access after a valid password is received (e.g., when the user enters a character-based password). The process then exits. Details of these operations are described in the following sections.

A. Selecting Gestures Based on Device Capabilities

Figure 2:
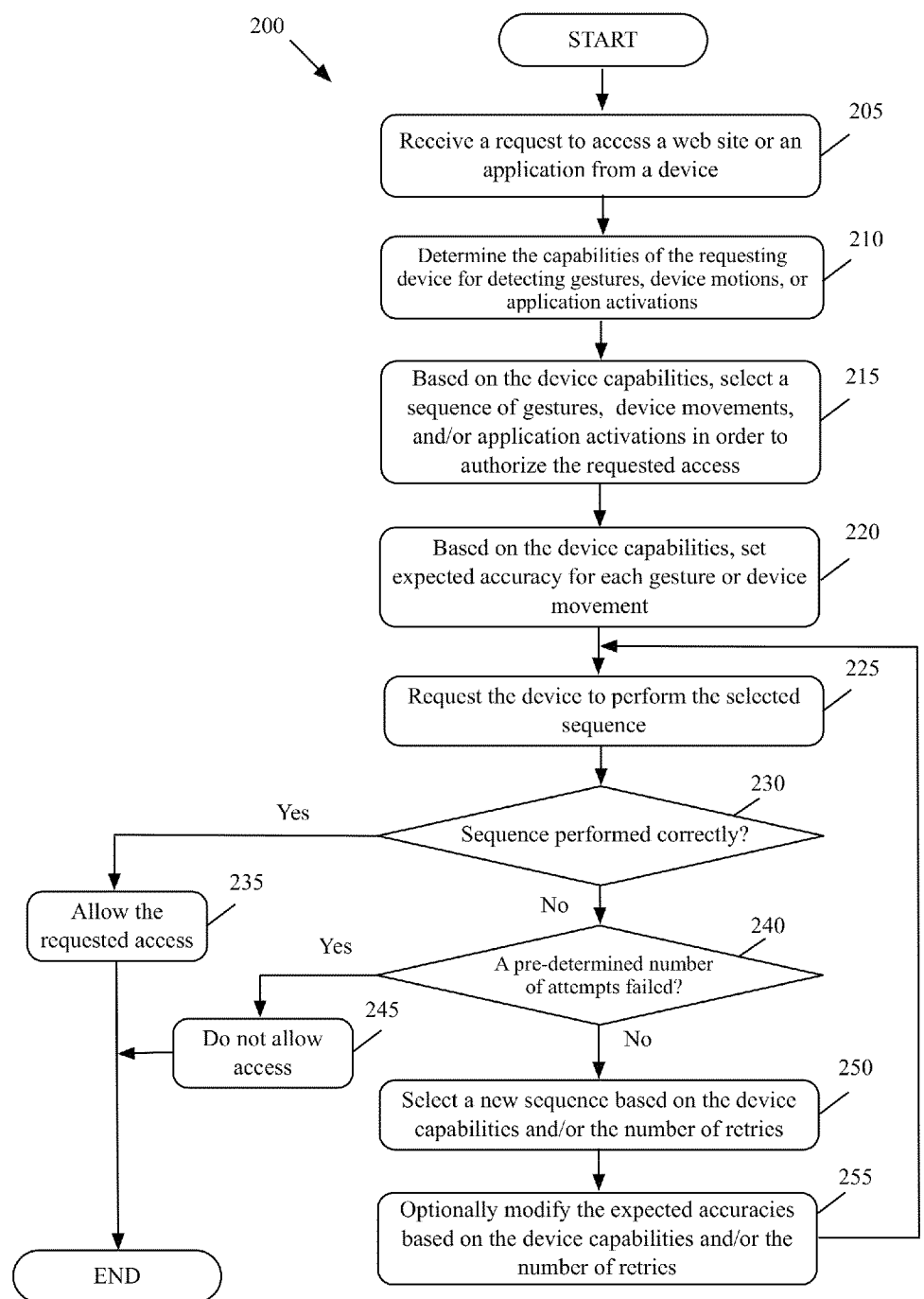
FIG. 2 conceptually illustrates a process for determining whether an access request is from a human or an automated application such as an Internet bot in some embodiments of the invention.

FIG. 2 conceptually illustrates a process 200 for determining whether an access request is from a human or an automated application such as an Internet bot in some embodiments of the invention. As shown, the process receives (at 205) a request to access a web page, a multimedia item, an application, or an online service from a device. The process determines (at 210) the capabilities of the requesting device for detecting gestures, device movements, and application activations. For instance, in some embodiments the requesting device performs an initial handshake during which the device provides its type (e.g., iPhone® 4S). The process then performs a table look up and determines that the requesting device has magnetometer, gyro, accelerometer, tilt, and microphone. In other embodiments, the requesting device provides a list of its capabilities during the initial handshake.

Based on the device capabilities, the process then selects (at 215) a sequence of gestures, device movements, and/or application activations in order to authorize the requested access. For instance, the gestures include one or more of tapping (any number of taps), pinching in and out (for zooming a view), panning or dragging, swiping (in any direction), rotating (fingers moving in opposite directions), long press (also known as "touch and hold"), etc. The device movements include detecting direction using compass, motion across the three axes (x, y, and z), shaking or tilting to detect vigorous movement of the device, tilting to change orientation from portrait to landscape or vice versa, etc. Application activations include turning on the microphone and asking the user to speak/shout/blow/whistle into microphone to generate different voice pitch, presenting the user with a control to invoke camera binding and/or flash binding and taking a photo with the camera, etc.

The process also sets (at 220) expected accuracy for each gesture and/or device movements based on the device capabilities. For instance, for a mobile device with an advance magnetometer, one of the actions in the sequence might be to display a compass and ask the user to rotate the device to point to 271 degrees. On the other hand, for a mobile device with a less sensitive magnetometer, the action might be to rotate the device to point to northeast or to between 15 to 45 degrees.

Figure 3:
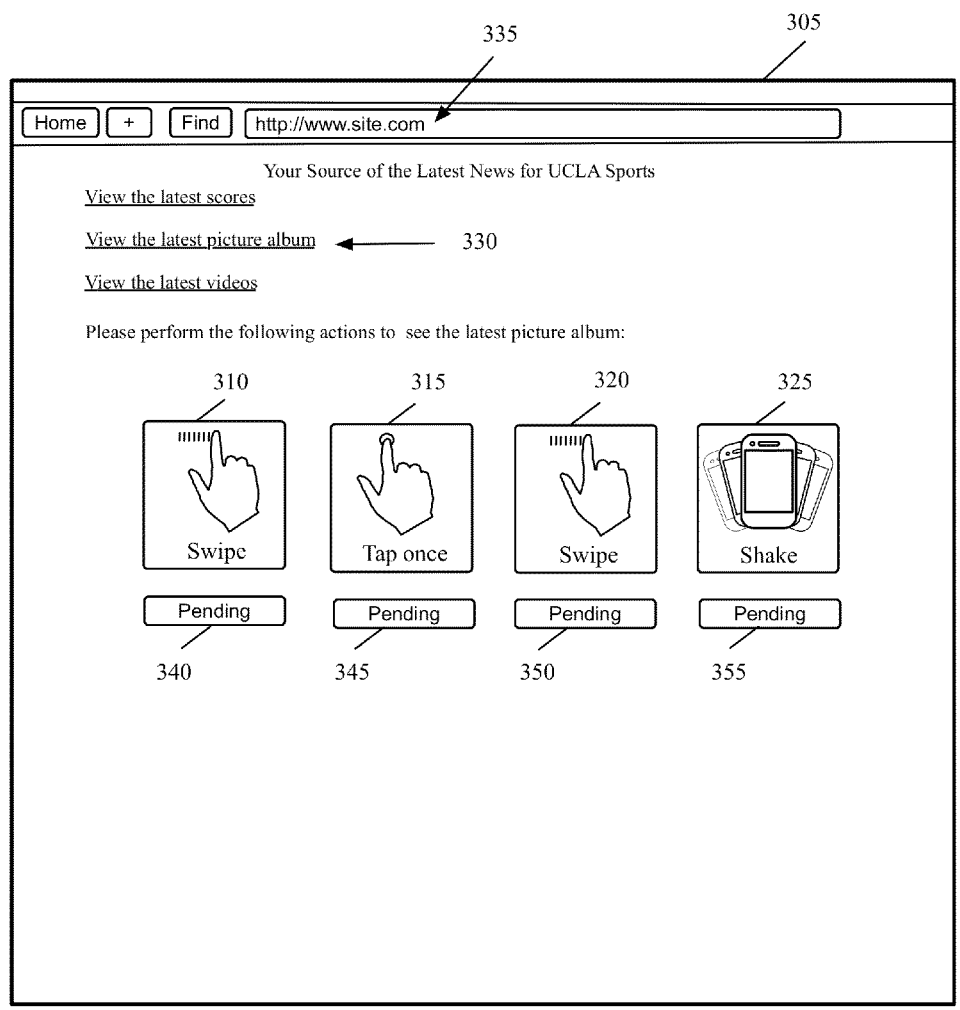
FIG. 3 conceptually illustrates a requested sequence displayed on the display screen of a touch pad device such as an iPad® in some embodiments of the invention.

The process then requests (at 225) the device to perform the selected sequence. FIG. 3 conceptually illustrates a requested sequence displayed on the display screen of a touch pad device such as an iPad® in some embodiments of the invention. As shown, all actions to be performed are displayed on the screen 305. In this example, the user is asked to perform a swipe 310, followed by a tap 315, followed by another swipe 320, followed by a shake 325 in order to gain access to a picture album 330 on site.com 335. The statuses 340-355 show that the actions are pending.

Figure 4:
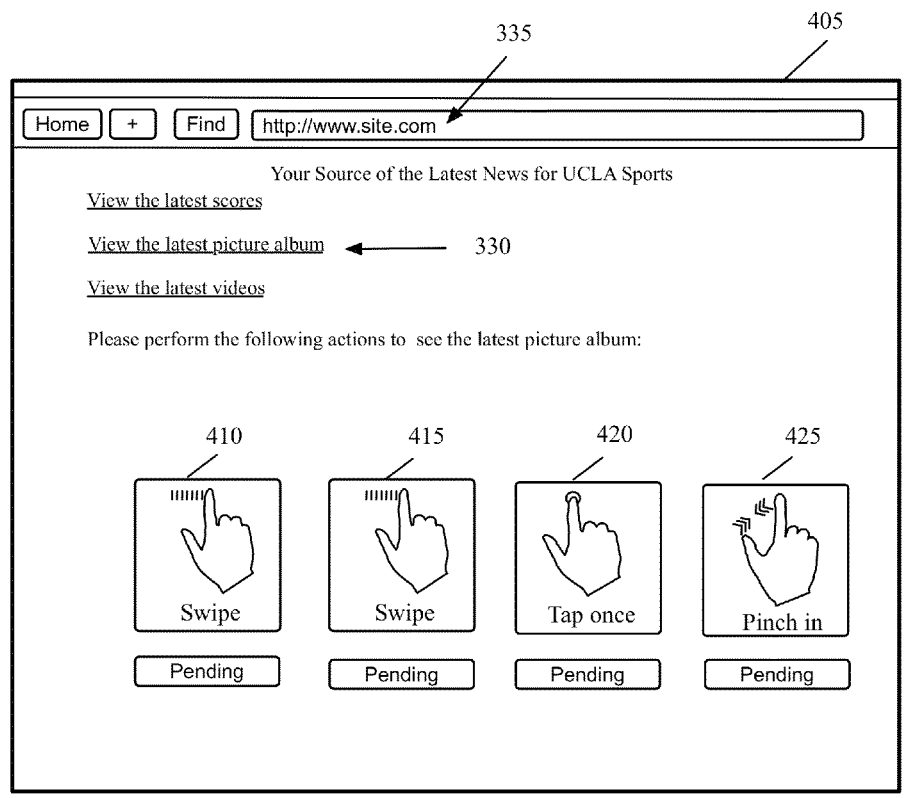
FIG. 4 conceptually illustrates a requested sequence displayed on the display screen of a device with fewer capabilities than the device of FIG. 3 in some embodiments of the invention.

Depending of the capabilities of a device, process 200 selects different sequences of actions for different device. FIG. 4 conceptually illustrates a requested sequence displayed on the display screen of a device with fewer capabilities than the device of FIG. 3 in some embodiments of the invention. As shown, although the request is to access the same picture album on the same web site, a different sequence of actions 410-425 is requested. For instance, process 200 considers that the device in FIG. 4 does not have accelerometer, magnetometer, or gyroscope. The actions are therefore limited to gestures performed on the screen 405.

The process determines (at 230) whether the requested sequence is performed correctly. If yes, the process assumes that the request is from a human and allows (at 235) the requested access. In some embodiments, the requested web page, application, or service has additional security requirements such as entering character based passwords, providing biometric information, etc., which has to be provided after the determination that the request is from a human and not an automatic application.

When the sequence is not performed correctly, the process determines (at 240) whether a pre-determined number of attempts to perform a requested sequence have failed. If so, the process does not allow (at 245) the requested access. The process then exits. In some embodiments, when request from a particular domain name or IP address fails a pre-determined number of time the particular domain name or IP address is black listed and is prevented from requesting access either indefinitely or for a certain period of time.

Figure 5:
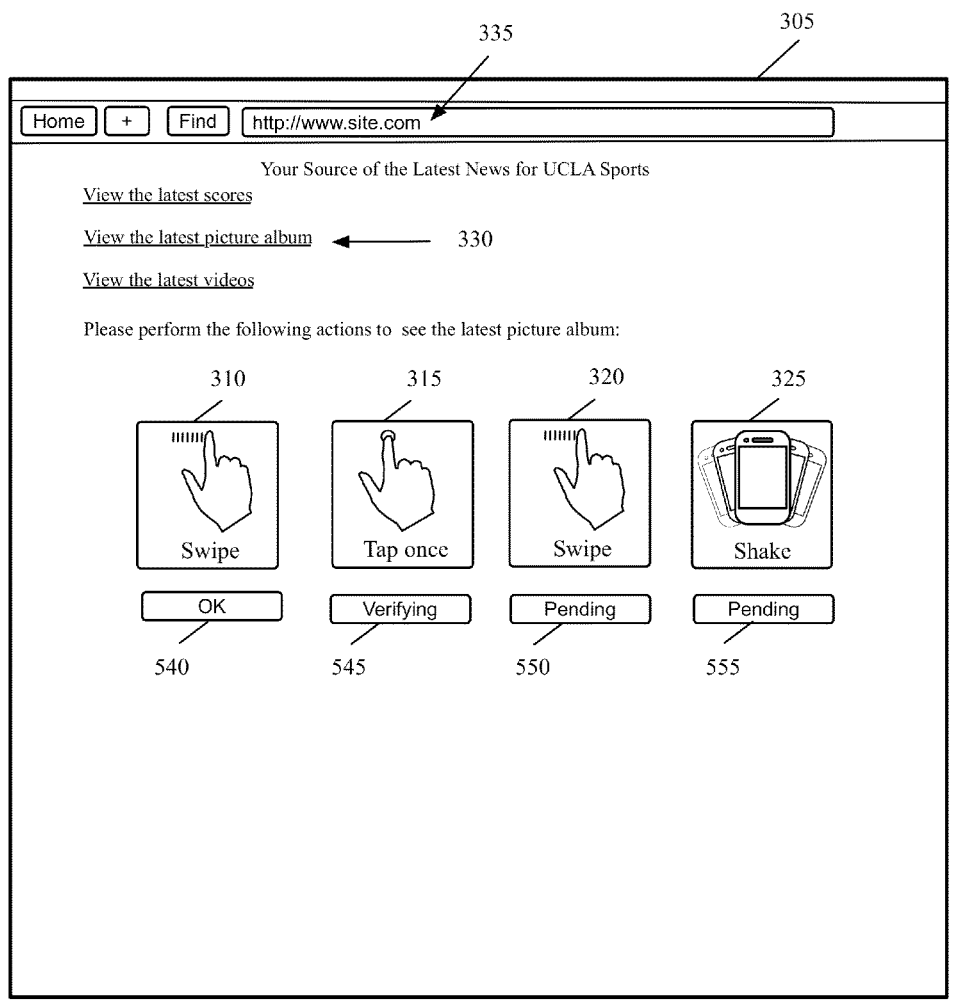
FIG. 5 shows the device of FIG. 3 after an action in the sequence is performed.

In some embodiments, after each action such as gesture, device movement, or application activation is performed, the user is informed whether the action was successful. FIG. 5 shows the device of FIG. 3 after an action in the sequence is performed. As shown in FIG. 5, the first action i.e., the first swipe 310 has been performed successfully (as shown by the corresponding status 540). The second action, the tap 315, is being verified (as shown by the corresponding status 545). The other two actions, the second swipe 320 and the shake 325, are not performed yet (as shown by the corresponding statuses 550 and 555).

Figure 6:
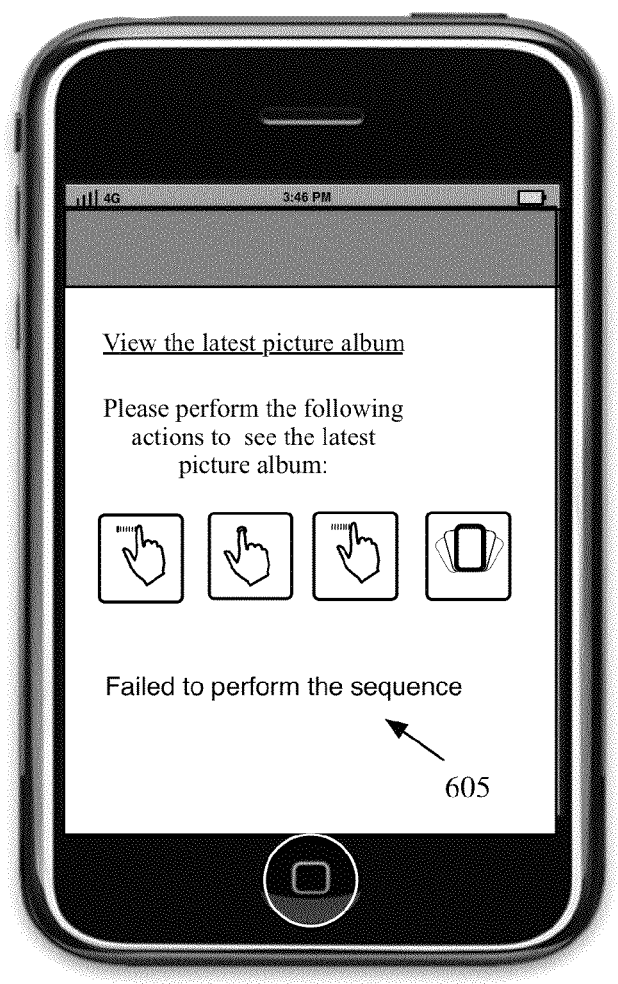
FIG. 6 conceptually illustrates the display screen of a device after performing a requested sequence has failed.

In other embodiments, the user is only informed whether the sequence was performed successfully after all actions in the sequence are performed. FIG. 6 conceptually illustrates the display screen of a device after performing a requested sequence has failed. As shown, the user is informed that the sequence has failed (as shown by the message 605) after all actions are performed.

Figure 7:
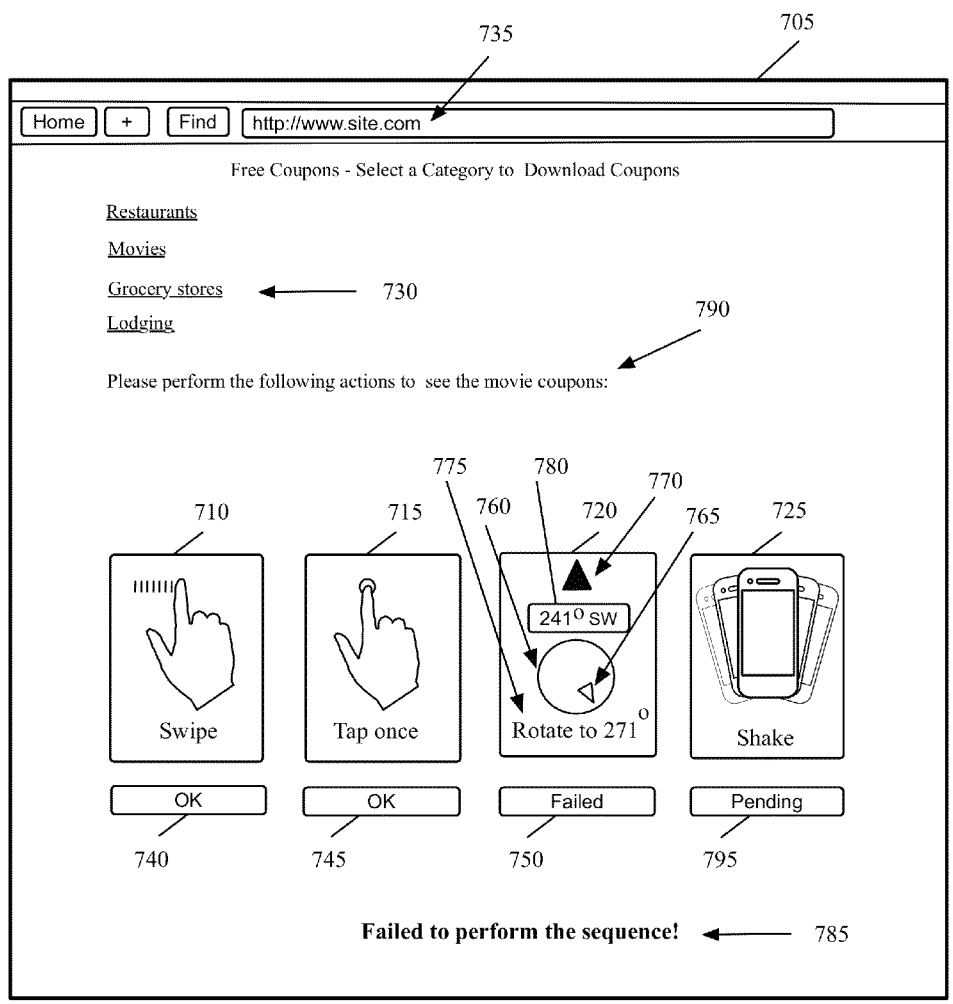
FIG. 7 conceptually illustrates a requested sequence displayed a mobile device in some embodiments of the invention.

Referring back to FIG. 2, when a pre-determined number of attempts have not failed, the process selects (at 250) a new sequence based on the device capabilities and/or the number of retries. FIG. 7 conceptually illustrates a requested sequence displayed a mobile device in some embodiments of the invention. The user is requested (as shown by 790) to perform a sequence of four actions 710-725 in order to be able to access and download grocery coupons 730 from site.com 735. In the example of FIG. 7, the user has been successful in performing the swipe 710 (as shown by status 740) and performing the single tap 715 (as shown by status 745). The user, however, was unable to rotate the device successfully (as shown by status 750). As shown, a compass 760 is displayed on the device display 705. An arrow 765 on the compass 760 points to north. Another arrow 770 shows the direction of the mobile device. The user was asked (as shown by 775) to rotate the device until the compass reading 780 shows 271 degrees. The user, however, was unable to rotate the device successfully as the compass reading 780 shows 241 degrees. In this example, the user is informed that performing the sequence has failed (as shown by 785) before the last action 725 is performed (as shown by 795).

B. Selecting Gestures Based on User Response History

Figure 8:
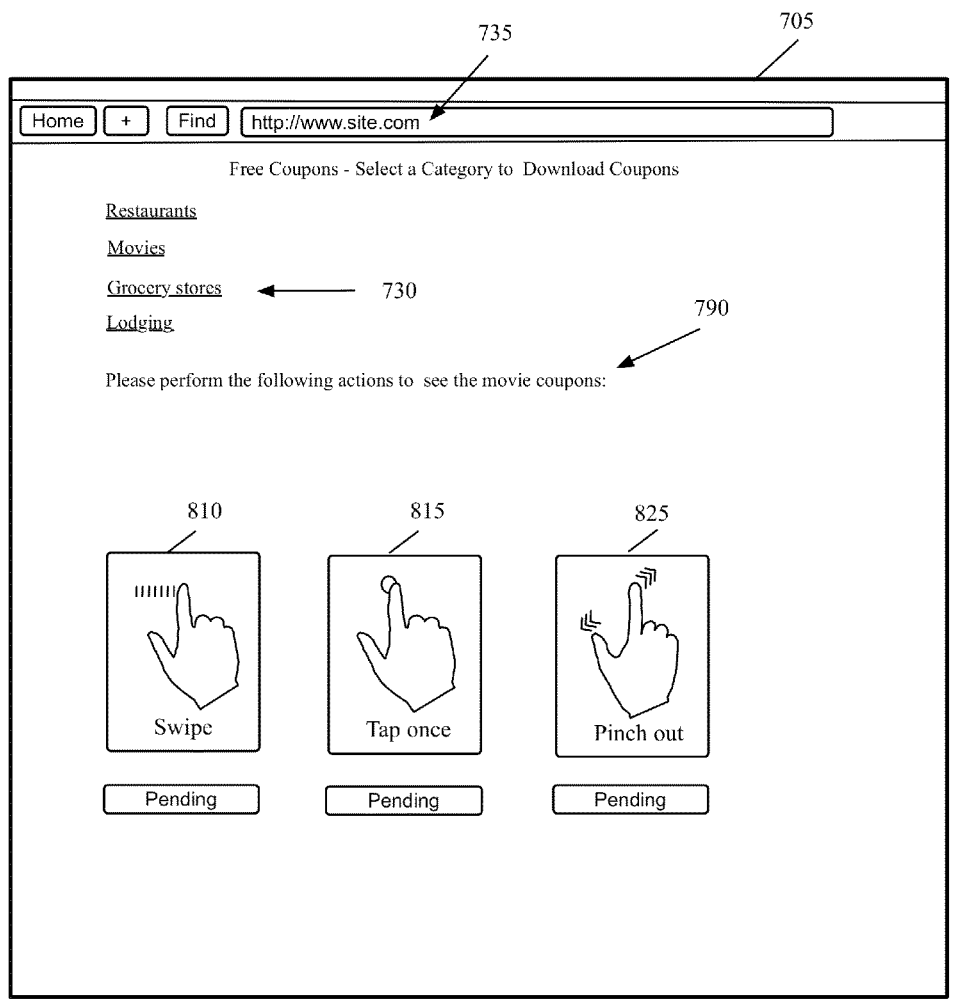
FIG. 8 shows a requested sequence displayed a mobile device of FIG. 7 as the user has failed several times to perform a sequence of four actions.

Process 200 in some embodiments utilizes different criteria for requesting the user to perform a new sequence. For instance, a new sequence with the same number of actions or a different number of actions is requested in some embodiments. Asking fewer actions prevents a legitimate user from being discouraged and abandoning the effort to gain access. On the other hand, asking more actions ensures a suspected automated application is prevented from gaining access. FIG. 8 shows a requested sequence displayed a mobile device of FIG. 7 as the user has failed several times to perform a sequence of four actions. As shown, the user is requested to enter only three relatively simple actions: swipe 810, tap once 815, and pinch out 825. For instance, process 200 has determined that the request has been received from an IP address that has no history of prior failures or process 200 determines that there is a high probability that the request is from a legitimate user based on prior actions by the user.

Figure 9:
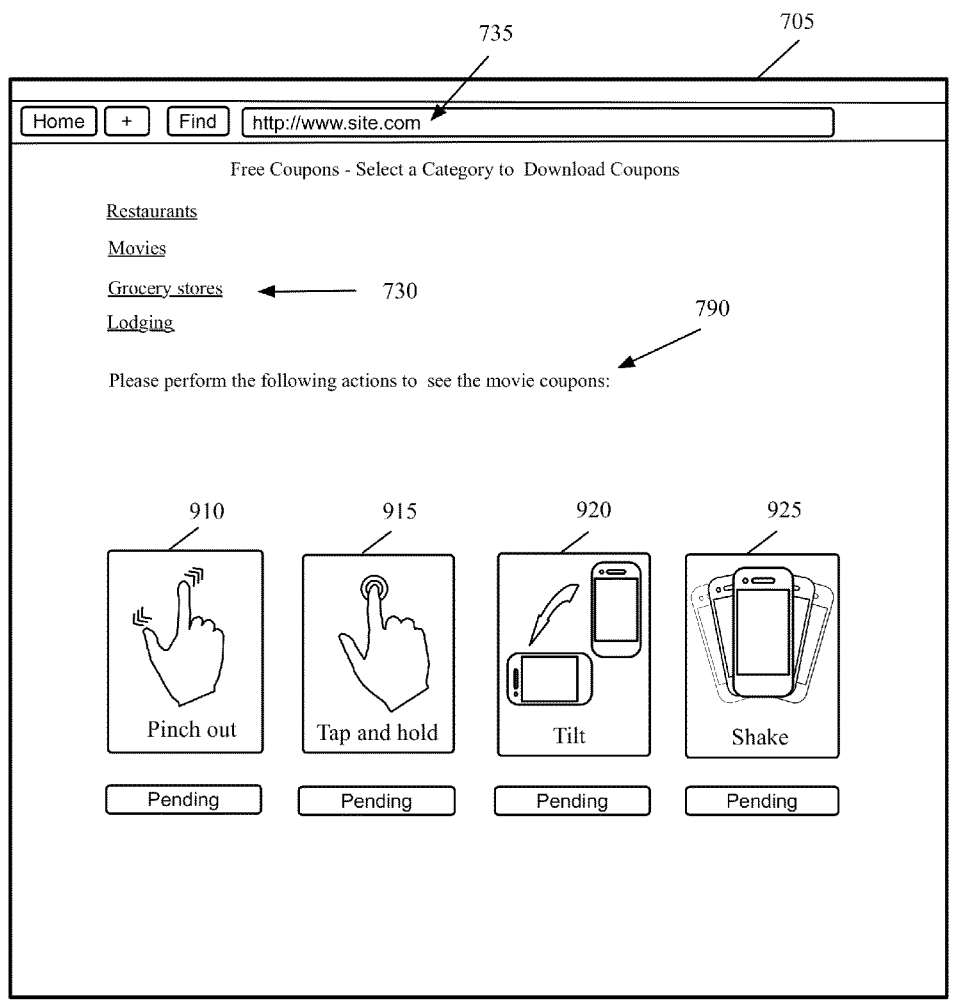
FIG. 9 illustrates the mobile device of FIG. 7 after a new sequence is displayed for the user to perform.

Also, process 200 changes the requested actions based on the type of capability a failed action required. For instance, in FIG. 7, the failed action requires a sensitive magnetometer to register a precise rotation angle. A strong magnetic interference, e.g., would result in the action to fail. Process 200 in some embodiments considers such a possibility and selects a new set of actions that do not require the use of a particular capability of the device. FIG. 9 illustrates the mobile device of FIG. 7 after a new sequence is displayed for the user to perform. As shown, a new sequence of four actions is requested. The actions, however, do not include rotation, which require the use of a magnetometer. The user is requested to do pinch out 910, followed by tap and hold 915, followed by tilt 920, followed by shake 925.

Figure 10:
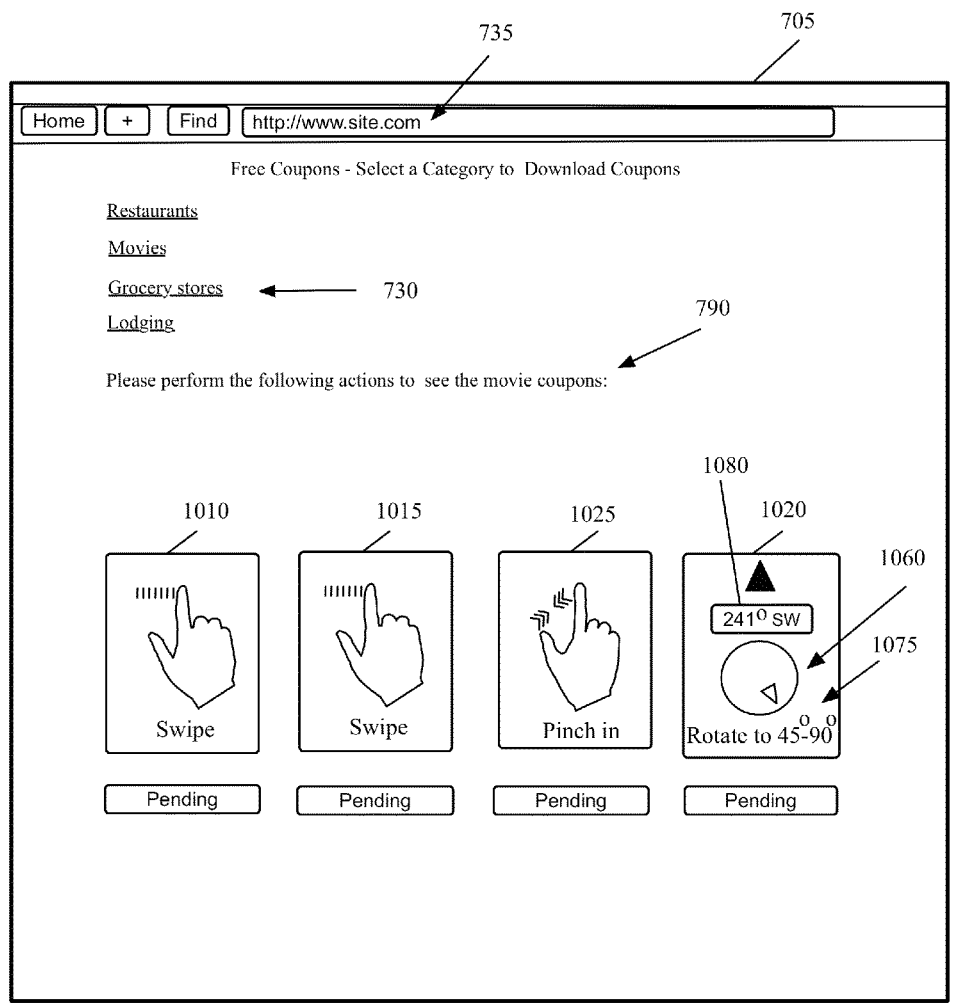
FIG. 10 illustrates the mobile device of FIG. 7 after a new sequence is displayed for the user to perform.

Referring back to FIG. 2, the process also optionally modifies (at 255) the expected accuracies based on the device capabilities and/or the number of retries. FIG. 10 illustrates the mobile device of FIG. 7 after a new sequence is displayed for the user to perform. As shown, the new sequence 1010-1020 still includes rotation 1020, which was failed in the previous attempt (as shown in FIG. 7). However, the expected accuracy of rotation is reduced from a precise degree to a range such as 45-90 degrees (as shown by 1075). The compass 1060 shows the current direction of the device (as shown by 1080) prior to the user making another attempt to rotate the device. Once a new sequence is displayed, the process then proceeds to 225, which was described above.

C. Software Architecture

Figure 11A:
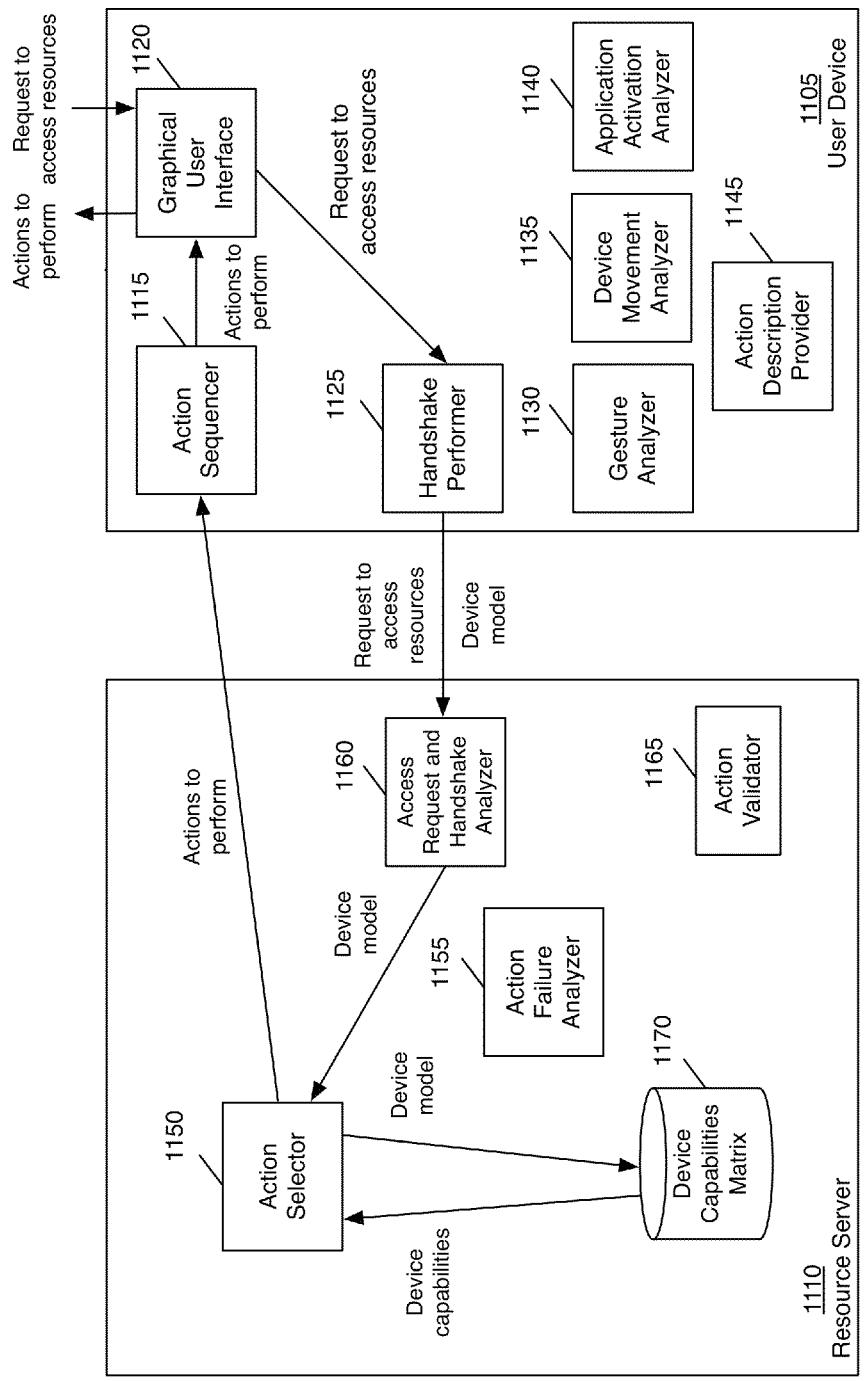
FIGS. 11A and 11B conceptually illustrate portions of a high-level software architecture of some embodiments.
Figure 11B:
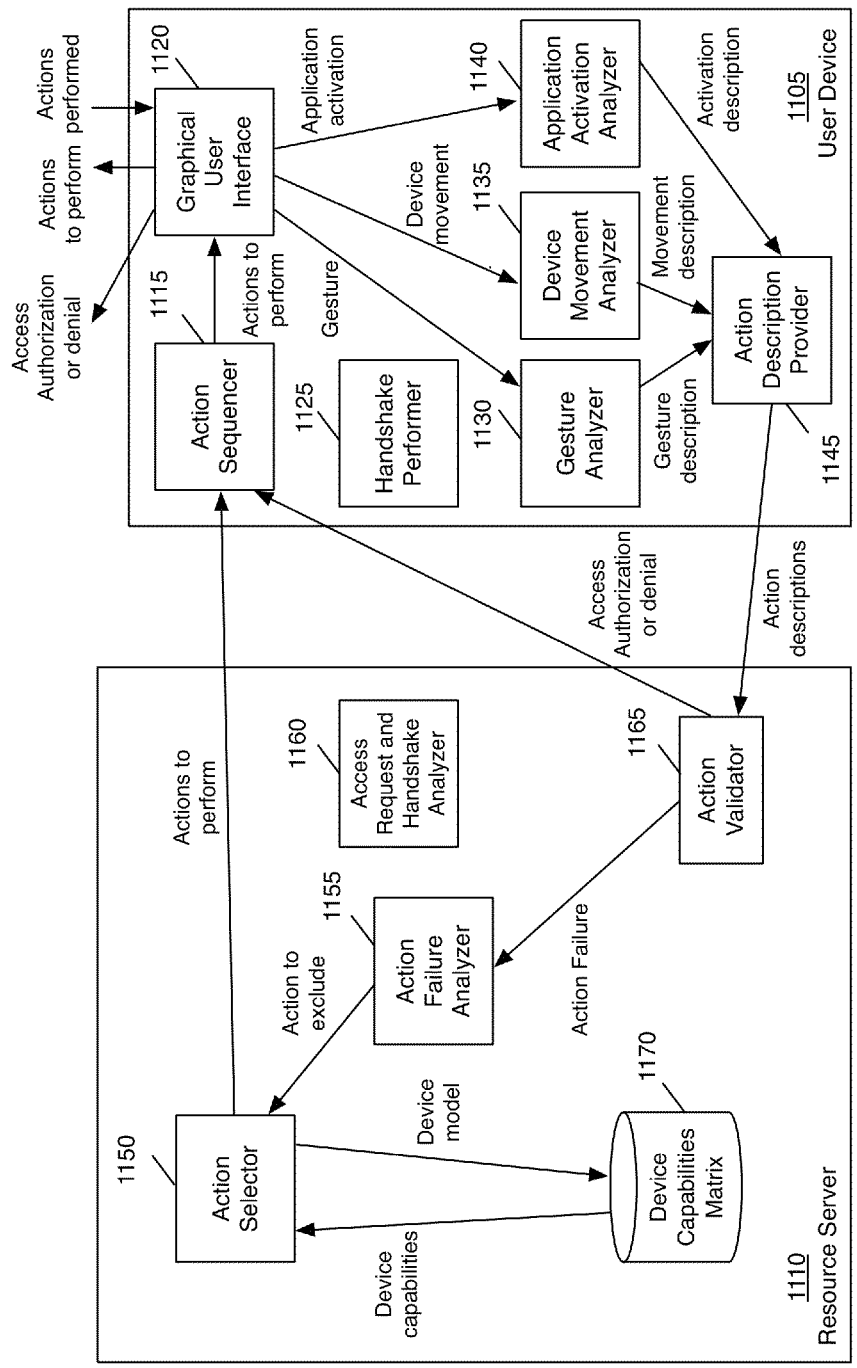

FIGS. 11A and 11B conceptually illustrate portions of a high-level software architecture of some embodiments. Some of the operations of processes 100 and 200 as well as different operations shown in user interfaces for utilizing gestures and device movements to distinguish human users from automated bots are performed by one or more modules in FIGS. 11A and 11B. As shown, the user device 1105 includes the following modules: action sequencer 1115, graphical user interface 1120, handshake performer 1125, gesture analyzer 1130, device movement analyzer 1135, application activation analyzer 1140, and action description provider 1145. The resource server 1110 includes the following modules: action selector 1150, action failure analyzer 1155, access request and handshake analyzer 1160, and action validator 1165. The resource server 1110 also includes storage for storing device capabilities matrix 1170.

One of ordinary skill in the art would recognize that the modules shown in FIG. 11A and FIG. 11B are specific to the process for utilizing gestures and device movements to distinguish human users from automated bots in some embodiments and that user devices and resource servers of some embodiments include numerous additional modules which are not shown in this figure.

As shown in FIG. 11A, the graphical user interface 1120 receives different user inputs including request to access resources such as a web page, a service, an application, etc. The request in some embodiments includes identification (e.g., IP address) of the requested resource.

The graphical user interface 1120 forwards the request to access resources to handshake performer module 1125. In some embodiments, handshake performer is a part of another application such as a browser (not shown) running on the user device. The handshake performer module 1125 sends the request to access resource along with the make and/or model of the user device to access request and handshake analyzer module 1160 of the resource server 1110.

The access request and handshake analyzer module 1160 forwards the device model to action selector module 1150, which uses the device model to retrieve the user device capabilities from device capabilities matrix 1170. The action selector module 1150 then selects a sequence of actions based on the user device capabilities and sends the actions to perform to action sequencer module 1115 of the user device. The action sequencer sends the actions to perform to graphical user interface 1120 module to display to the user.

As shown in FIG. 11B, the graphical user interface 1120 receives actions performed by the user and sends different actions such as gestures, device movements, and application activation to gesture analyzer 1130, device movement analyzer 1135, and application activation analyzer 1140 modules respectively. Gesture analyzer 1130, device movement analyzer 1135, and application activation analyzer 1140 modules analyze the received actions and prepare a description of each action and send them to action description provider 1145 module.

Action description provider module 1145 sends the action descriptions to action validator module 1165 of the resource server 1110, which determines whether the requested sequence of actions is successfully performed by the user. If the sequence was performed successfully, an access authorization is sent to the action sequencer 1115 in the user device, which sends the authorization to graphical user interface to display to the user. If the sequence was not performed successfully and a pre-determined number of retrials had also failed, the action validator sends an access denial to the user device. If a pre-determined number of attempts to perform a requested sequence have not been done, action validator 1165 sends the information about the failed action or actions to action failure analyzer module 1155.

Action failure analyzer module 1155 analyzes the failures and determines the actions to be excluded from the next sequence. For instance, if attempt to rotate the device had failed one or more times before, the action failure analyzer module excludes rotation from the next sequence (e.g., to prevent interference to keep on failing the rotation action).

The action selector 1150 selects a new sequence of actions that can have the same or a different number of actions as well as the same types or different types of actions. The actions to perform are sent to action sequencer 1115 of the user device. The action sequencer 1115 sends the actions to perform to graphical user interface 1120 module to display to the user. The actions performed by the user are processed as described by reference to FIG. 11A, above and the process repeats until a requested sequence is performed successfully or the number of attempts exceeds the number of allowed attempts.

II. Utilizing Gestures, Device Movements, and Application Activations to Authenticate Users Some embodiments utilize a sequence of gestures, device movements, and/or application activations in order to authenticate a particular user in the same way that a character-based password is used. As described in the following sections, the user is given the option to select a particular sequence of actions for gaining access to an account. The user then utilizes the actions to get authorized for accessing the account.

A. Selecting an Action-Based Sequence for Accessing an Account

Figure 12:
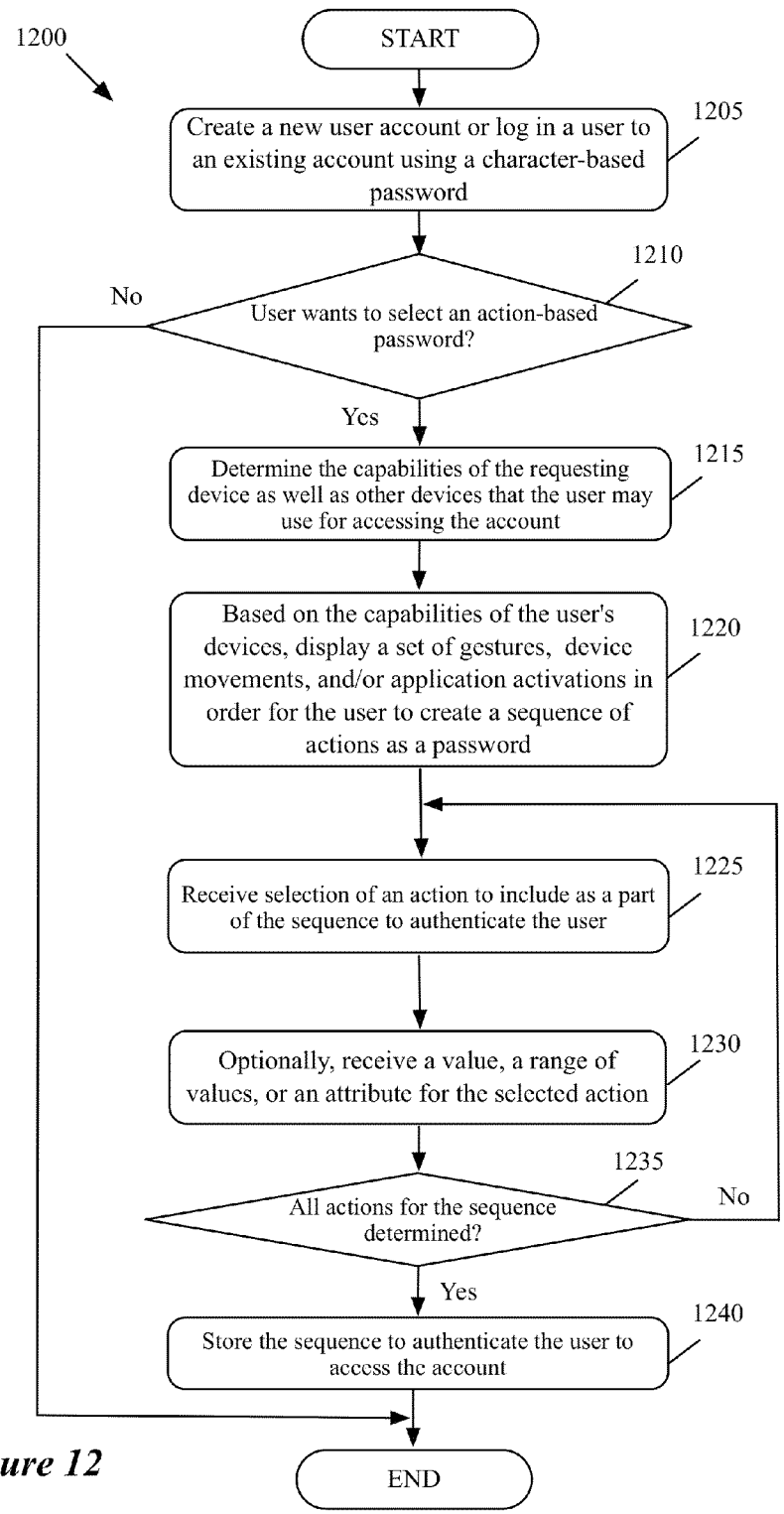
FIG. 12 conceptually illustrates a process for setting up a sequence of gestures, device movements, and/or application activations in some embodiments of the invention.

FIG. 12 conceptually illustrates a process 1200 for setting up a sequence of gestures, device movements, and/or application activations in some embodiments of the invention. As shown, the process receives a request (at 1205) to create a new account for a user or logs in a user with a traditional character-based password.

The process then determines (at 1210) whether the user wants to select an action-based password. If not, the process exits. Otherwise, the process determines (at 1215) the capabilities of the requesting device for detecting gestures and device motions. For instance, in some embodiments the requesting device performs an initial handshake during which the device provides its type (e.g., iPhone® 3). The process then performs a table look up and determines that the requesting device has magnetometer, gyro, accelerometer, tilt, and microphone. In other embodiments, the requesting device provides a list of its capabilities during the initial handshake.

Figure 13:
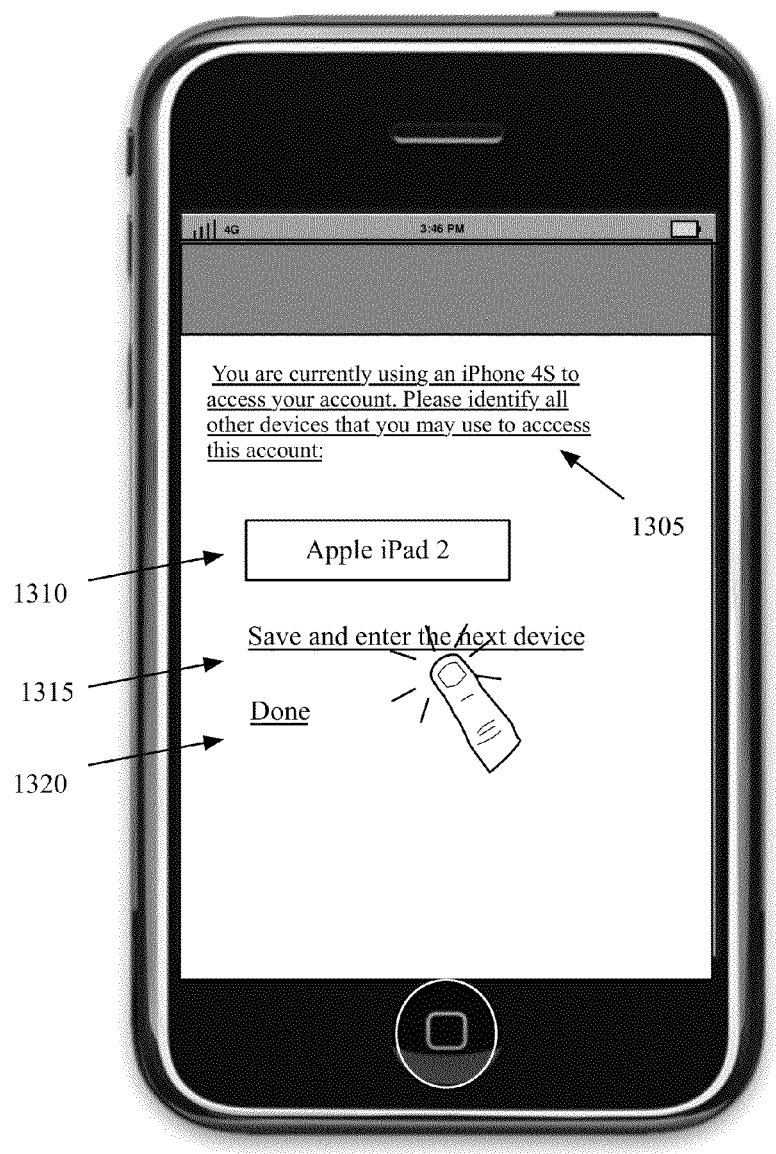
FIG. 13 conceptually illustrates a user interface for allowing the user to enter the make and model of other devices that the user may utilize to access the account in some embodiments of the invention.

Since most users use a variety of different devices with different capabilities, some embodiments allow a user to select a sequence of actions by considering not only the capabilities of the device current being used by the user to interact with process 1200 but also the capabilities of other devices that the user might use to access the account. For instance, in some embodiments, process 1200 allows the user to enter the model of other devices that the user may utilize to access the account. FIG. 13 conceptually illustrates a user interface for allowing the user to enter the make and model of other devices that the user may utilize to access the account in some embodiments of the invention. As shown, the user is requested (as shown by 1305) to enter the make and model of other devices that the user intends to use. In this example, the user has entered Apple iPad® 2 (as shown by 1310) as another device that the user might use to access the account. The user is selecting a control 1315 to save the device information and enter the next device model. After all device identification are entered, the user proceeds to the next step of setting up the password by selecting control 1320.

Figure 14:
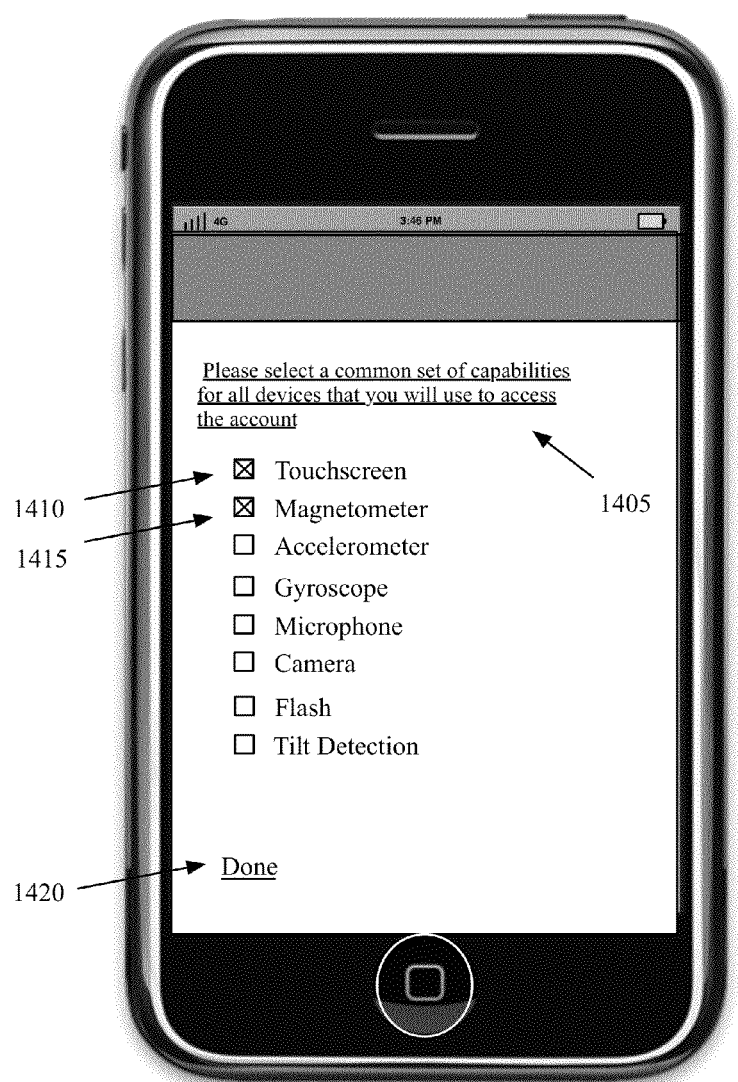
FIG. 14 conceptually illustrates a user interface for setting up an action-based password in some embodiments of the invention.

In some embodiments, process 1200 presents a list of capabilities and allows the user to select the minimum set of capabilities that all devices that the user might use to access the account have. FIG. 14 conceptually illustrates a user interface for setting up an action-based password in some embodiments of the invention. As shown, a list of capabilities is displayed and the user is asked (as shown by 1405) to select a common set of capabilities that all devices used by the particular user to access the account have. In this example, the user has selected touchscreen 1410 and magnetometer 1415 as a common capability for all devices that the user may utilize to access the account. The user finalizes the selection e.g., by selecting a control 1420.

Figure 15:
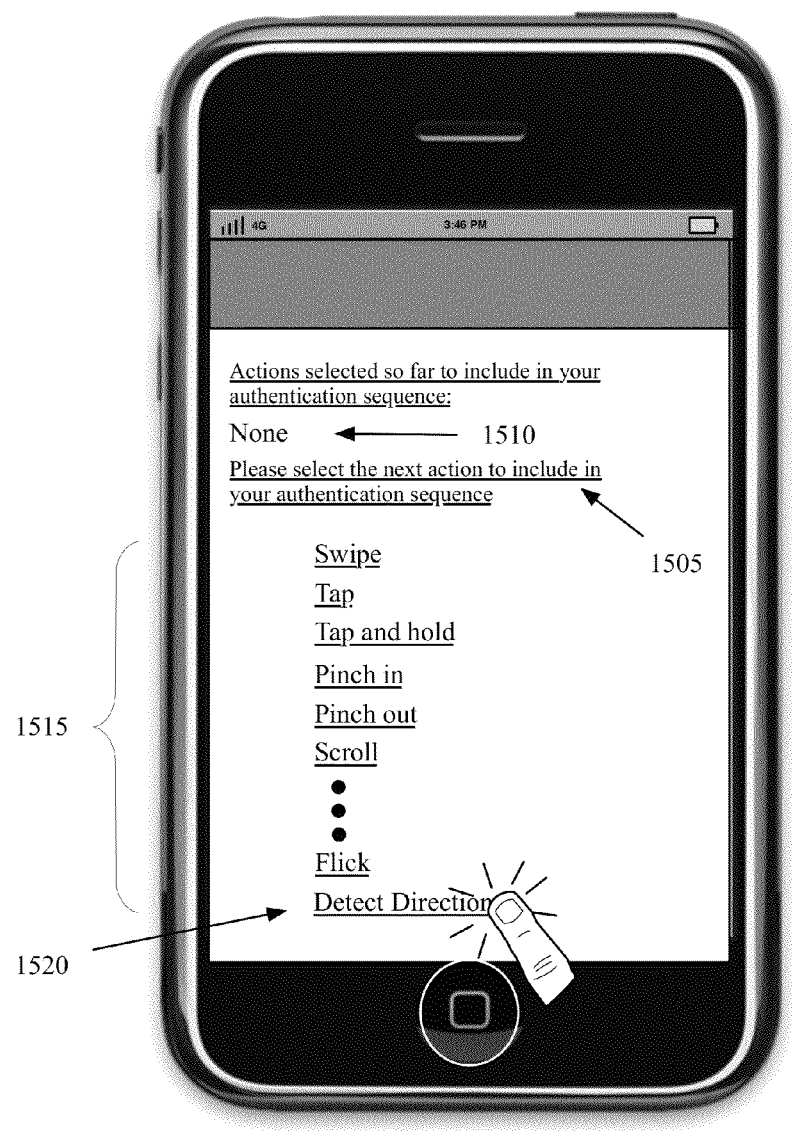
FIG. 15 conceptually illustrates a user interface in some embodiments of the invention for displaying a set of gestures, device movements, and application activations to a user to select for a password.

Based on the capabilities of the user's devices, process 1200 displays (at 1220) a set of gestures, device movements, and/or application activations in order for the user to create a sequence of actions as a password. FIG. 15 conceptually illustrates a user interface in some embodiments of the invention for displaying a set of gestures, device movements, and application activations to a user to select for a password. The user is asked (as shown by 1505) to select the next action to be included in the authentication process. A list 1510 of the actions selected so far is also displayed (in this example nothing is selected so far). A list 1515 of actions is displayed and the user has selected "detect direction" as the first action to be included in the password.

Figure 16:
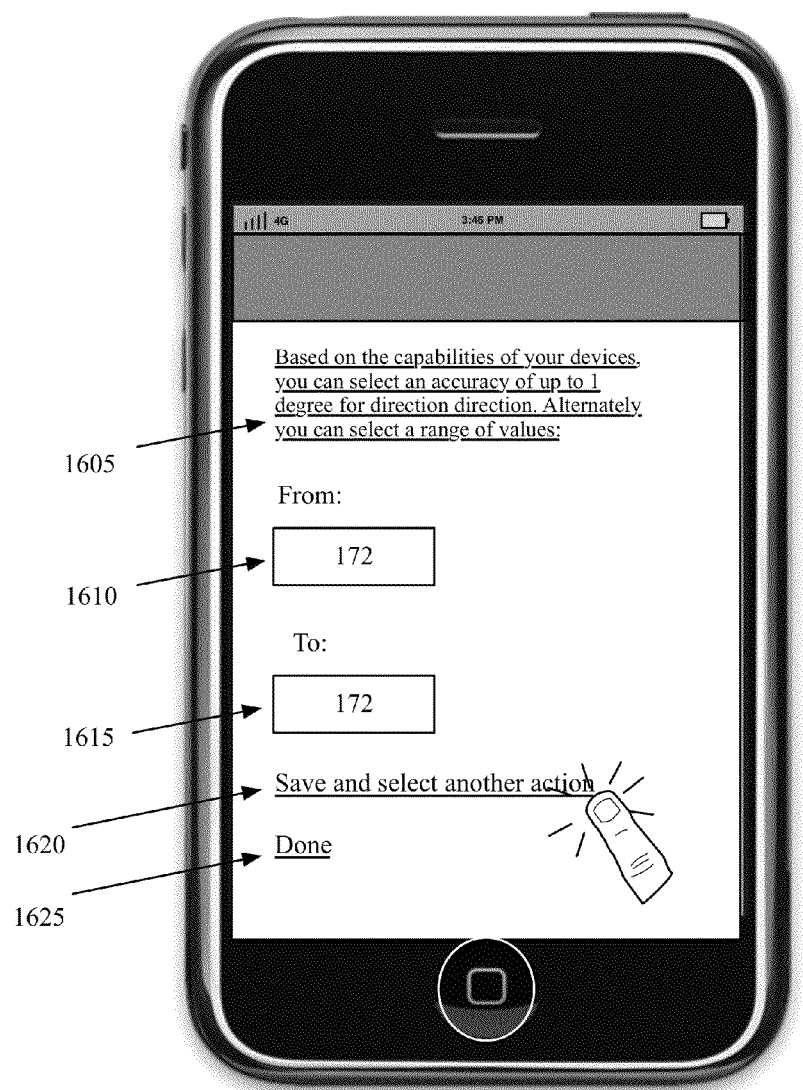
FIG. 16 conceptually illustrates a user interface in some embodiments of the invention for receiving a value, a range of values, or an attribute for the user action.

Process 1200 then receives (at 1225) a selection of an action to be included in the sequence to authenticate the user. The process receives the selection, e.g., when the user in FIG. 15 selects one of the actions such as "detect direction" 1520. Depending on the selection made by the user, the process 1200 also receives (at 1230) values, rang of values, or attributes for each gesture, device movement, or application activation selected by the user. For instance, when the user selects "detect direction", the process asks the user to enter a value or a range of values for validating the direction. FIG. 16 conceptually illustrates a user interface in some embodiments of the invention for receiving a value, a range of values, or an attribute for the user action. The user is informed (as shown by 1605) that based on the make and model of the user's devices, the user can select an accuracy of up to 1 degree for the direction detection. The user is also given the option to enter a range for a quicker but less accurate authentication. In this example, the user has selected 172 degrees for both the lower threshold and the higher threshold of the range. By this selection, the user has to rotate the user device to show a 172 degrees direction in order to pass the action's challenge. By selecting a single degree as oppose to a range, the user has opted for more security versus more convenient in responding to the action challenge. Process 1200 then determines (at 1235) whether another action has to be selected for the sequence. If not (e.g., when the user selects control 1625 in FIG. 16), the process stores (at 1240) the sequence to authenticate the user to access the account in future. The process then exits.

Otherwise, when the use wants to select another action (e.g., when the user selects control 1620 in FIG. 16), the process proceeds to 1225 to receive another selection from the user. The process continues until the user selects a set of actions to include in the password. In some embodiments, instead of the user determining the number of actions in the authentication sequence, process 1200 determines the numbers of actions.

Figure 17:
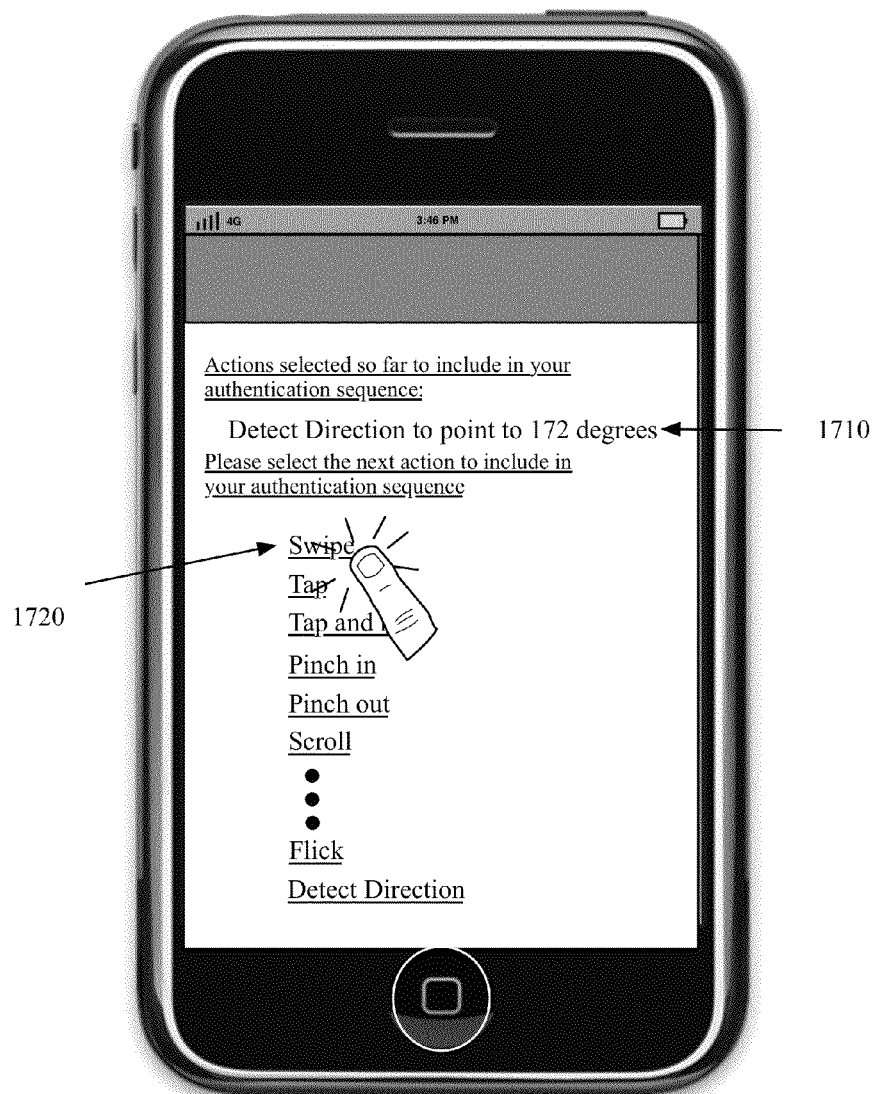
FIG. 17 conceptually illustrates another example of an action selected by a user for inclusion in the sequence for authorizing the user in some embodiments of the invention.
Figure 18:
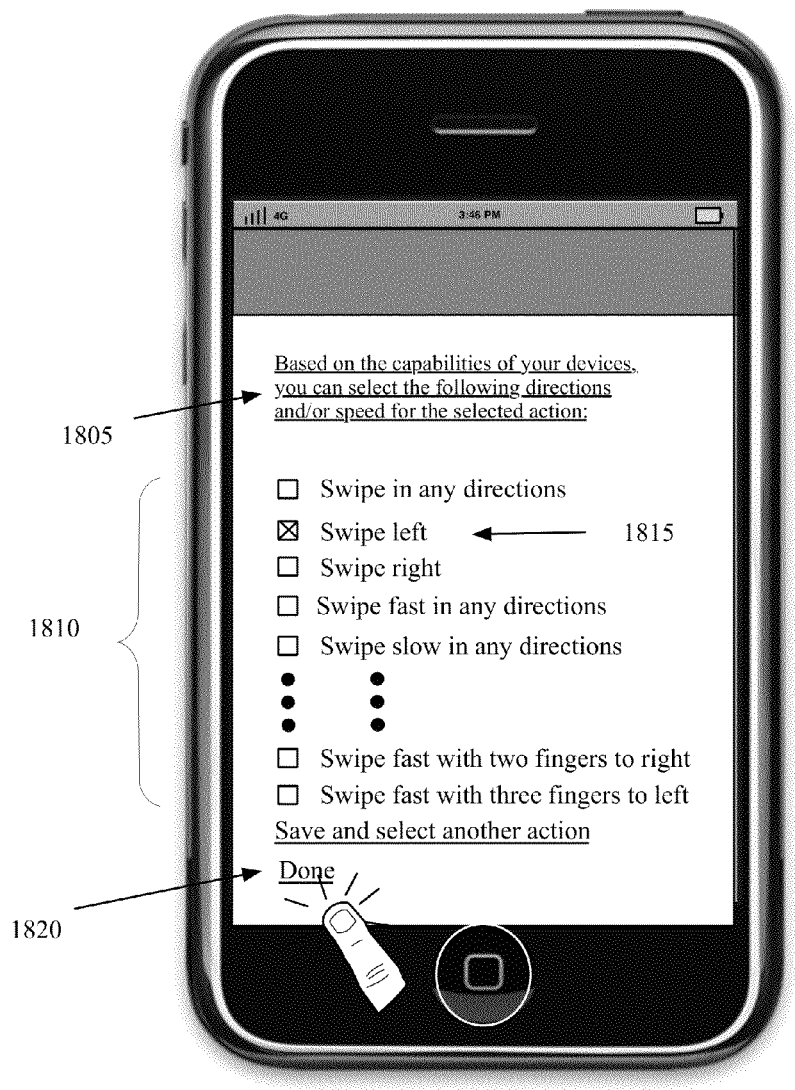
FIG. 18 conceptually illustrates a user interface in some embodiments of the invention for receiving a value, a range of values, or an attribute for the user action after the user has selected swipe for inclusion in the sequence.

FIG. 17 conceptually illustrates another example of an action selected by a user for inclusion in the sequence for authorizing the user in some embodiments of the invention. The user has already selected "detect direction" (as shown by 1710) and has selected swipe 1720 as the next action to be included in the sequence. FIG. 18 conceptually illustrates a user interface in some embodiments of the invention for receiving a value, a range of values, or an attribute for the user action after the user has selected swipe for inclusion in the sequence. The user is asked (as shown by 1805) to select an attribute for the swipe action. A list 1810 of different options is also displayed. The list includes different choices ranging from the least restrictive type of swipe, swipe in any direction (and with no speed restrictions) to swipe in a particular direction, with a particular number of touch points, and a particular speed (e.g., swipe fast with three fingers to left). In this example, the user has selected swipe left (as shown by 1815) as the action to be included in the sequence. The user has also decided that swipe is the last action to be included in the sequence (as shown by 1820).

Figure 19:
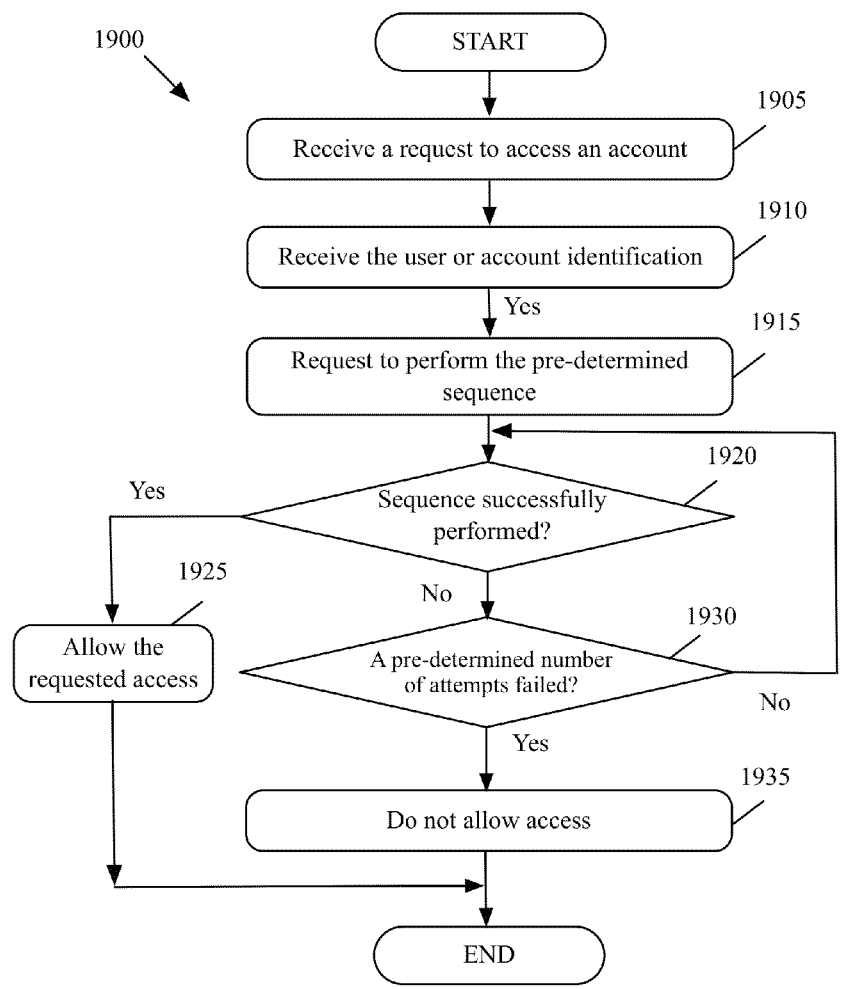
FIG. 19 conceptually illustrates a process for accessing an account by performing a sequence of gestures, device movements, and/or application activations in some embodiments of the invention.

B. Accessing an Account Using a Sequence of Gestures, Device Movements, and Application Activations Once a sequence of actions is established to authorize a user access to an account, the user can use the sequence to gain access to the account. FIG. 19 conceptually illustrates a process 1900 for accessing an account by performing a sequence of gestures, device movements, and/or application activations in some embodiments of the invention. As shown, the process receives (at 1905) a request to access an account. The process then receives (at 1910) the user or the account identification. The process then requests (at 1915) the user to perform the pre-determined sequence to gain access to the account.

The process then determines (at 1920) whether the sequence has been successfully performed. If yes, the process allows (at 1925) access to the account. Otherwise, the process determines (at 1930) whether a pre-determined number of attempts have failed. If so, the process does not allow (at 1935) access to the account and exits. In some embodiments, after a pre-determined number of failed attempts, the process starts a time-out delay before accepting any further attempts to log in the user to the account. In some embodiments, the time-out gets progressively longer as more attempts fail in performing the sequence. Also, when request from a particular domain name or IP address fails a pre-determined number of time, the particular domain name or IP address is black listed and is prevented from requesting access either indefinitely or for a certain period of time in some embodiments. If a pre-determined number of attempts have not failed yet, the process proceeds back to 1920 to allow further attempts to perform the sequence.

C. Software Architecture

Figure 20A:
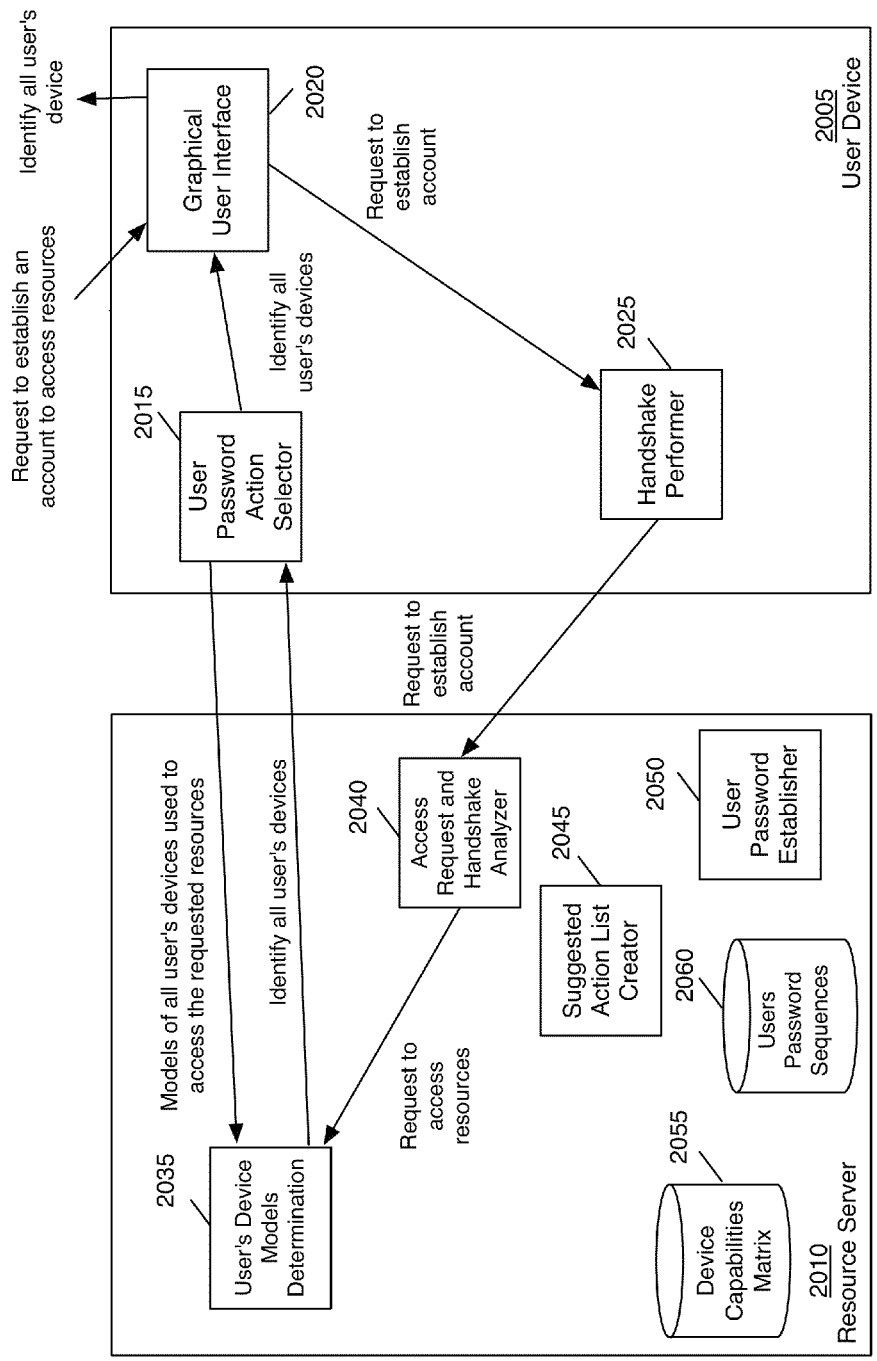
FIGS. 20A-20C conceptually illustrate portions of a high-level software architecture of some embodiments.
Figure 20B:
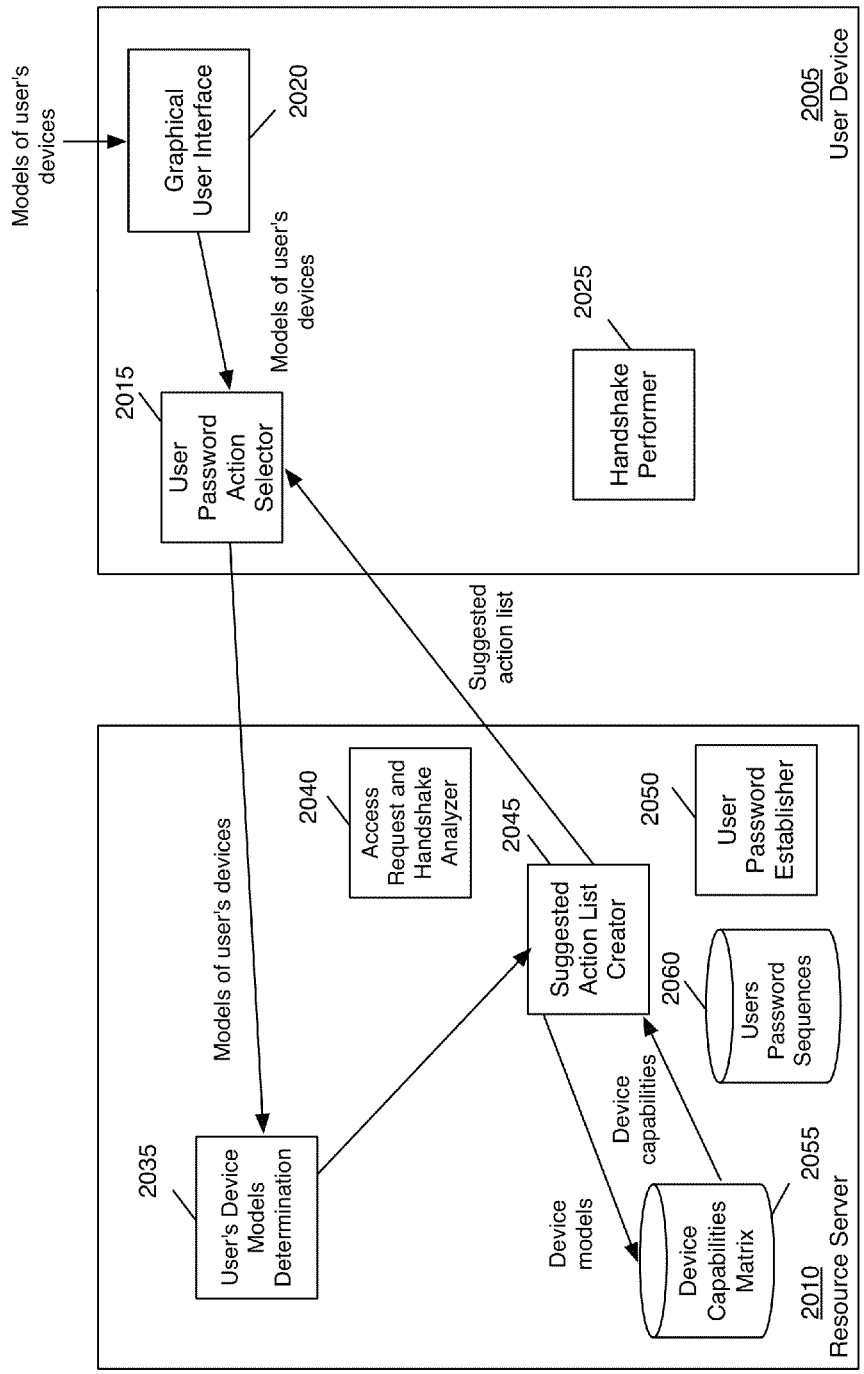
Figure 20C:
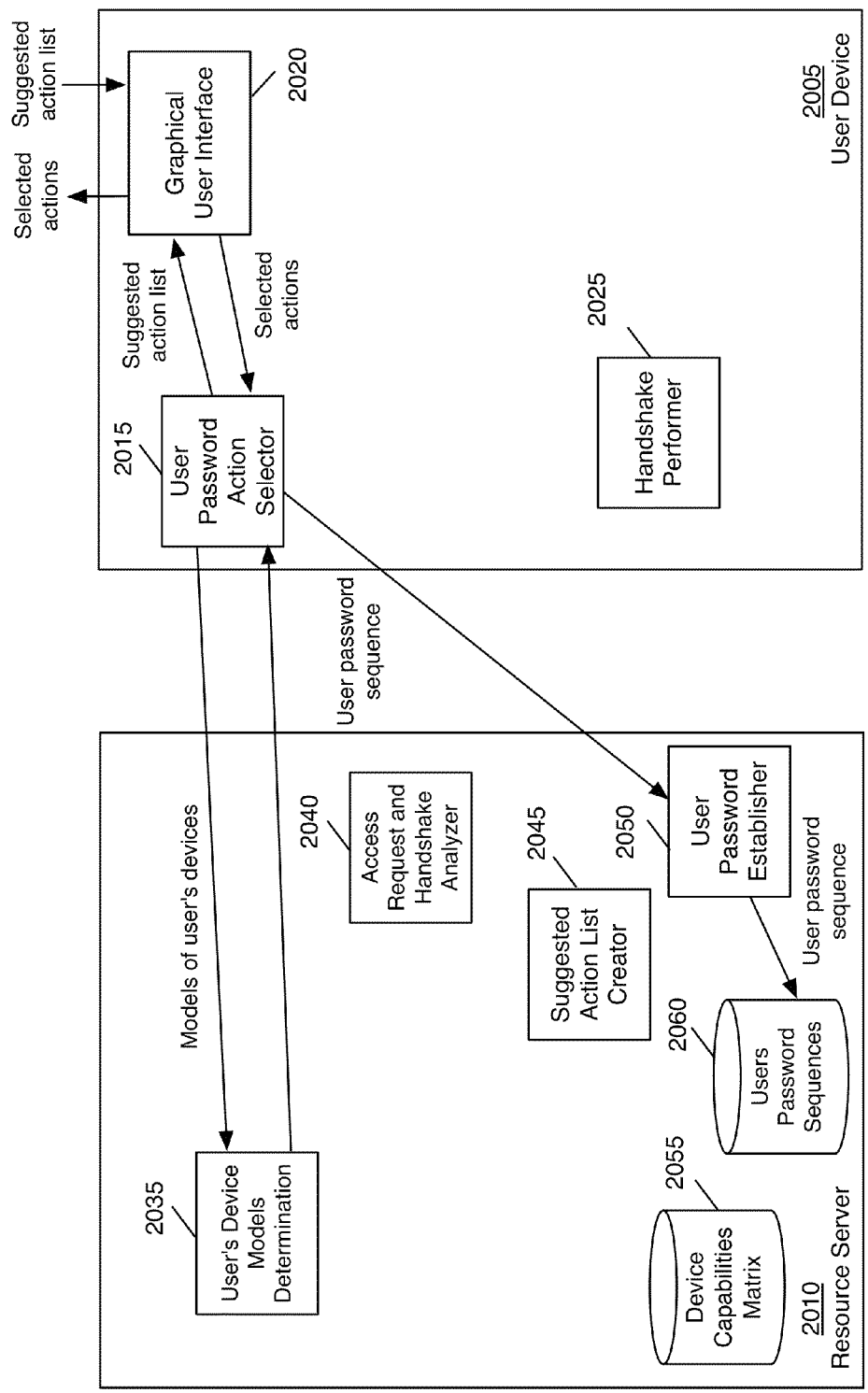

FIGS. 20A-20C conceptually illustrate portions of a high-level software architecture of some embodiments. Some of the operations of processes 100 and 1200 as well as different operations shown in user interfaces for utilizing gestures and device movements for user authentication are performed by one or more modules in FIGS. 20A-20C. One of ordinary skill in the art would recognize that the modules shown in FIGS. 20A-20C are specific to the process for utilizing gestures and device movements for user authentication in some embodiments and that user devices and resource servers of some embodiments include numerous additional modules which are not shown in this figure.

As shown in FIG. 20A, the user device 2005 includes the following modules: user password action selector 2015, graphical user interface 2020, and handshake performer 2025. The resource server 2010 includes the following modules: user's device models determination 2035, access request and handshake analyzer 2040, suggested action list creator 2045, and user password establisher 2050. The resource server 2010 also includes storage for storing device capabilities matrix 2055 and users password sequences 2060. Although the resource server 2010 is shown as a separate entity, in some embodiments, the resource server 2010 is a part of the user device 2005. For instance, the requested resource can be an application in a user device shared by multiple users and the described modules are utilized to authenticate each individual user. In these embodiments, some of the modules, e.g., handshake performer 2025 and access request and handshake analyzer 2040 are not required since all modules reside on the same device. In other embodiments, the resource server 2010 is a separate entity than the user device 2005.

As shown in FIG. 20A, the graphical user interface 2020 receives different user inputs including request to establish an account to access resources. The graphical user interface 2020 forwards the request to access resources to handshake performer module 2025. In some embodiments, handshake performer is a part of another application such as a browser (not shown) running on the user device. The handshake performer module 2025 sends the request to access resource to access request and handshake analyzer module 2040 of the resource server 2010.

The access request and handshake analyzer module 2040 forwards the request to user's device models determination module 2035, which determines all devices that the user would use to access the requested resources in future. This information is used by other modules of the resource server to establish a set of common capabilities of the user's devices in order to establish a sequence of actions as a password to access the account.

User's device models determination module 2035 sends a request to identify all user's devices to user password action selector module 2015 of the user device 2005. The user password action selector module 2015 forwards the request to graphical user interface 2020 to display the request to the user.

As shown in FIG. 20B, the graphical user interface 2020 receives models of user's devices and forwards them to user password action selector module 2015. User password action selector module 2015 forwards the models to user's device models determination module 2035 of the resource server 2010. User's device models determination module 2035 uses the models of user's devices to determine a set of common capabilities of the user's devices. User's device models determination module 2035 utilizes the user device models to get their capabilities from device capabilities matrix 2055. User's device models determination module 2035 prepares a list of suggested actions based on common capabilities of the user's devices and sends the list to user's password action selector module 2015 of the user device.

As shown in FIG. 20C, user's password action selector module 2015 sends the suggested action list to graphical user interface 2020 to display to the user. The graphical user interface 2010 receives the list of actions selected by the user and sends the sequences of actions to user password establisher module 2050. User password establisher module 2050 saves a copy of the user password sequence in users password sequences storage 2060 that has a list of passwords used by different users of the resource server.

Figure 21A:
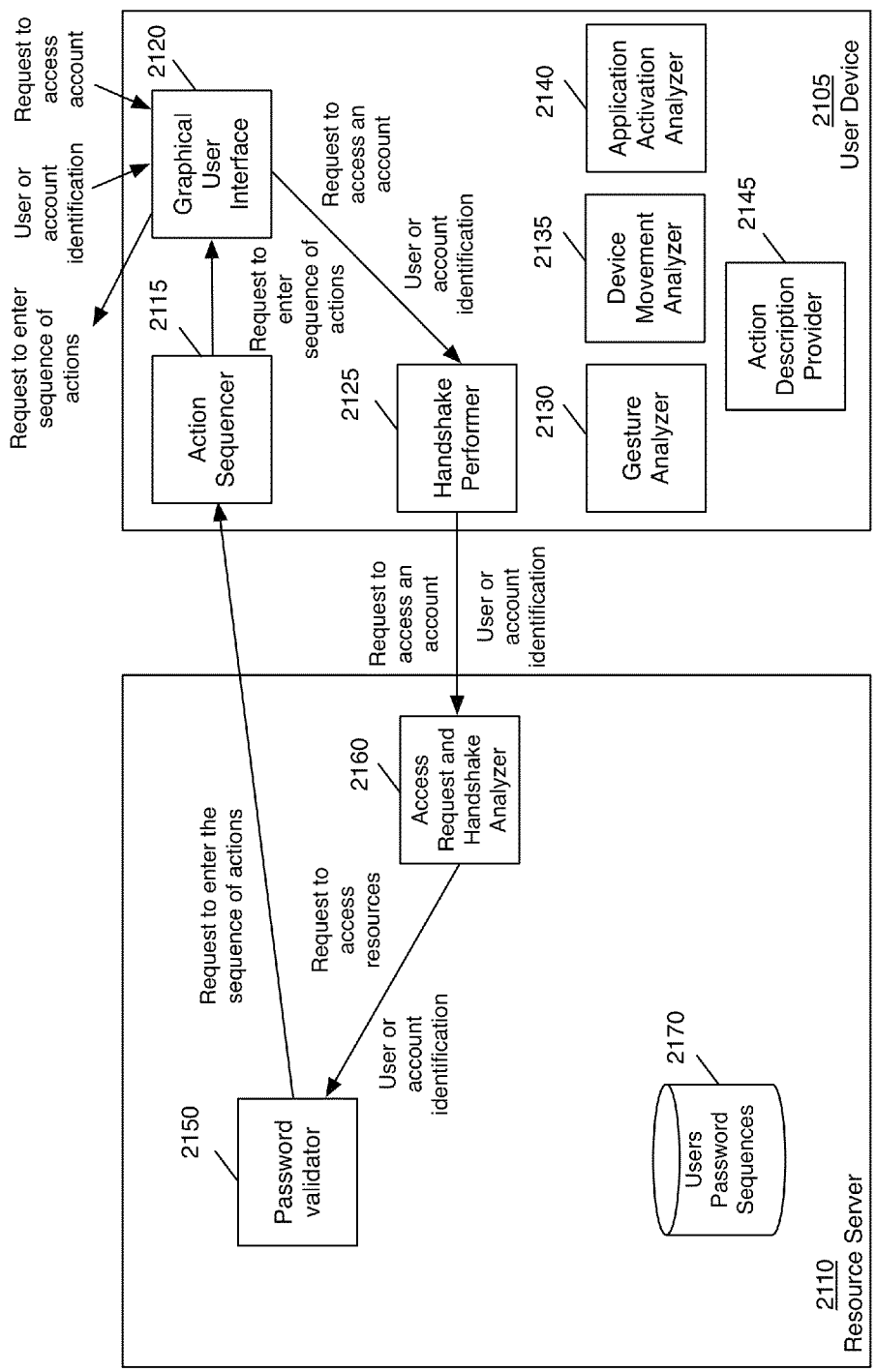
FIGS. 21A and 21B conceptually illustrate portions of a high-level software architecture of some embodiments.
Figure 21B:
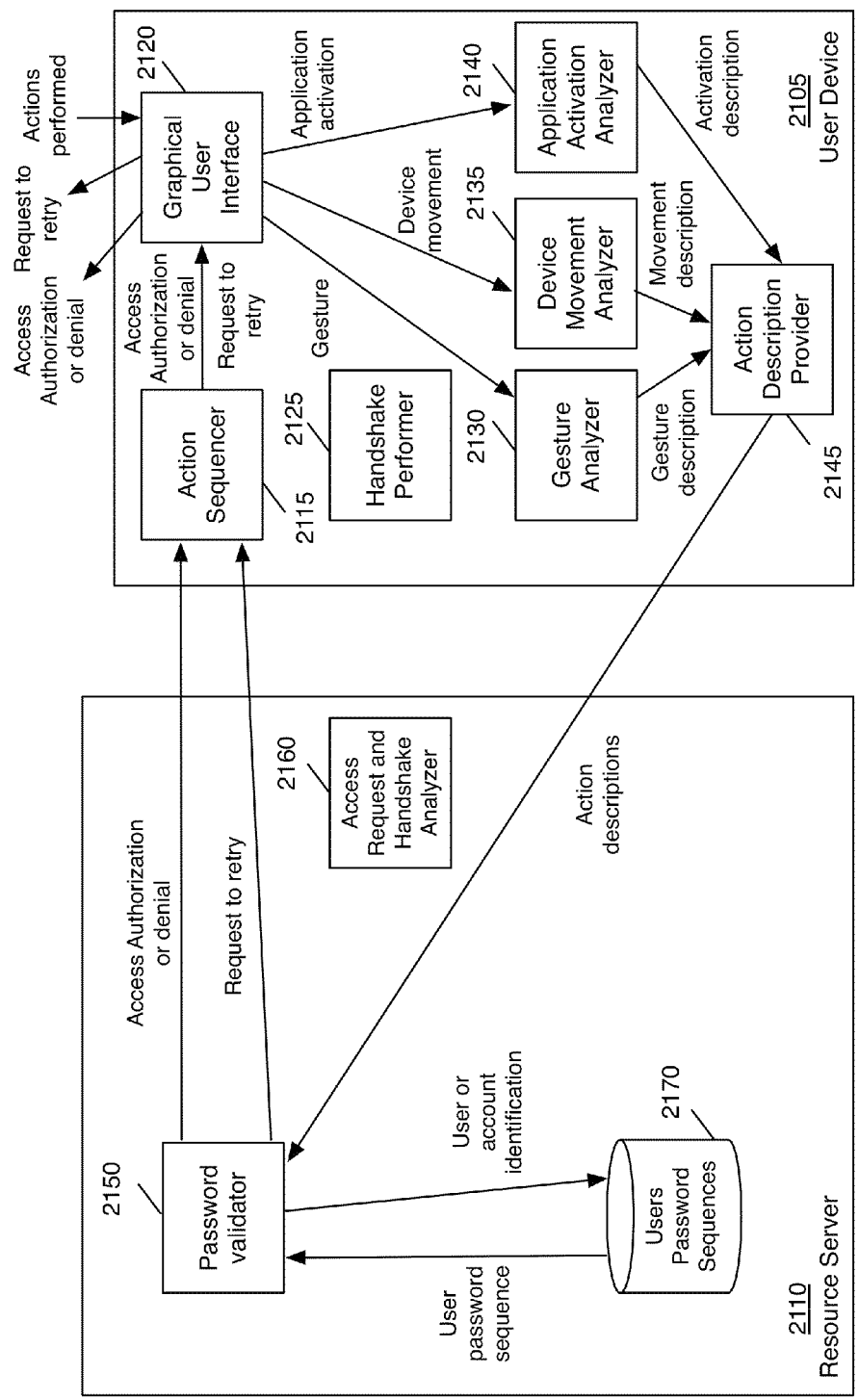

FIGS. 21A and 21B conceptually illustrate portions of a high-level software architecture of some embodiments. Some of the operations of processes 100 and 1900 as well as different operations shown in user interfaces for utilizing gestures and device movements for user authentication are performed by one or more modules in FIGS. 21A and 21B. As shown, the user device 2105 includes the following modules: action sequencer 2115, graphical user interface 2120, handshake performer 2125, gesture analyzer 2130, device movement analyzer 2135, application activation analyzer 2140, and action description provider 2145. The resource server includes the following modules: password validator 2150 and access request and handshake analyzer 2160. The resource server 2110 also includes storage for storing users password sequences 2170.

One of ordinary skill in the art would recognize that the modules shown in FIG. 21A and FIG. 21B are specific to the process for utilizing gestures and device movements for user authentication in some embodiments and that user devices and resource servers of some embodiments include numerous additional modules which are not shown in this figure.

As shown in FIG. 21A, the graphical user interface 2120 receives different user inputs including request to access an account along with user or account identification. The graphical user interface 2120 forwards the request and the identification to handshake performer module 2125. In some embodiments, handshake performer is a part of another application such as a browser (not shown) running on the user device. The handshake performer module 2125 sends the request and the identification to access request and handshake analyzer module 2160 of the resource server 2110.

The access request and handshake analyzer module 2160 forwards the request and the identification to password validator module 2150. Password validator module 2150 sends a request to enter the sequence of actions that was established as the password to action sequencer module 2115 of the user device 2105. The action sequencer module 2115 sends the request to the graphical user interface 2120 module to display to the user.

As shown in FIG. 21B, the graphical user interface 2120 receives actions performed by the user and sends different actions such as gestures, device movements, and application activation to gesture analyzer 2130, device movement analyzer 2135, and application activation analyzer 2140 modules respectively. Gesture analyzer 2130, device movement analyzer 2135, and application activation analyzer 2140 modules analyze the received actions and prepare a description of each action and send them to action description provider module 2145.

Action description provider module 2145 sends the action descriptions to password validator module 2150 of the resource server 2110, which determines whether the sequence of actions is successfully performed by the user. The password validator module 2150 uses the user or account identification to get the sequence of actions that is used as a password for the user and/or the account from the users password sequences 2170 storage. If the sequence performed matches the password, an access authorization is sent to the user device. If the sequence did not match the password and a pre-determined number of retrials had also failed, the password validator sends an access denial to the user device. If a pre-determined number of attempts to perform a requested sequence have not been done, password validator module 2150 sends a request to retry to action sequencer module 2115 of the user device.

The action sequencer module 2115 sends the request to graphical user interface 2120 module to display to the user. The actions performed by the user are processed as described by reference to FIG. 21A, above and the process repeats until the sequence performed matches the user password or the number of attempts exceeds the number of allowed attempts.

Although the user device 2105 and the resource server 2110 are shown as separate entities, the resource server is in some embodiments a part of the user device (e.g., the resource server is an application running on the user device). In these embodiments, some of the modules, e.g., handshake performer 2125 and access request and handshake analyzer 2160 are not required since all modules reside on the same device.

III. Identifying a User from a Group of Users of an Application by Utilizing Gestures and Device Movements Some embodiments utilize a sequence of gestures, device movements, and/or application activations in order to identify a particular user from a group of users that are using a resource such as an application. As described in the following sections, the user is given the option to select a particular sequence of actions for gaining access to an account. The user then utilizes the actions to get identify himself/herself when accessing the application or resource.

A. Identifying Different Users that Share a Resource from a Set of Gestures and Device Movements Each user is requested to select a sequence of one or more actions to identify himself/herself to the application. Some embodiments utilize a process similar to process 1200 described by reference to FIG. 12, to select a unique sequence of actions, device movements, and/or application activations. The users then utilize their unique sequence of actions in order to identify themselves to the resource or application.

Figure 22:
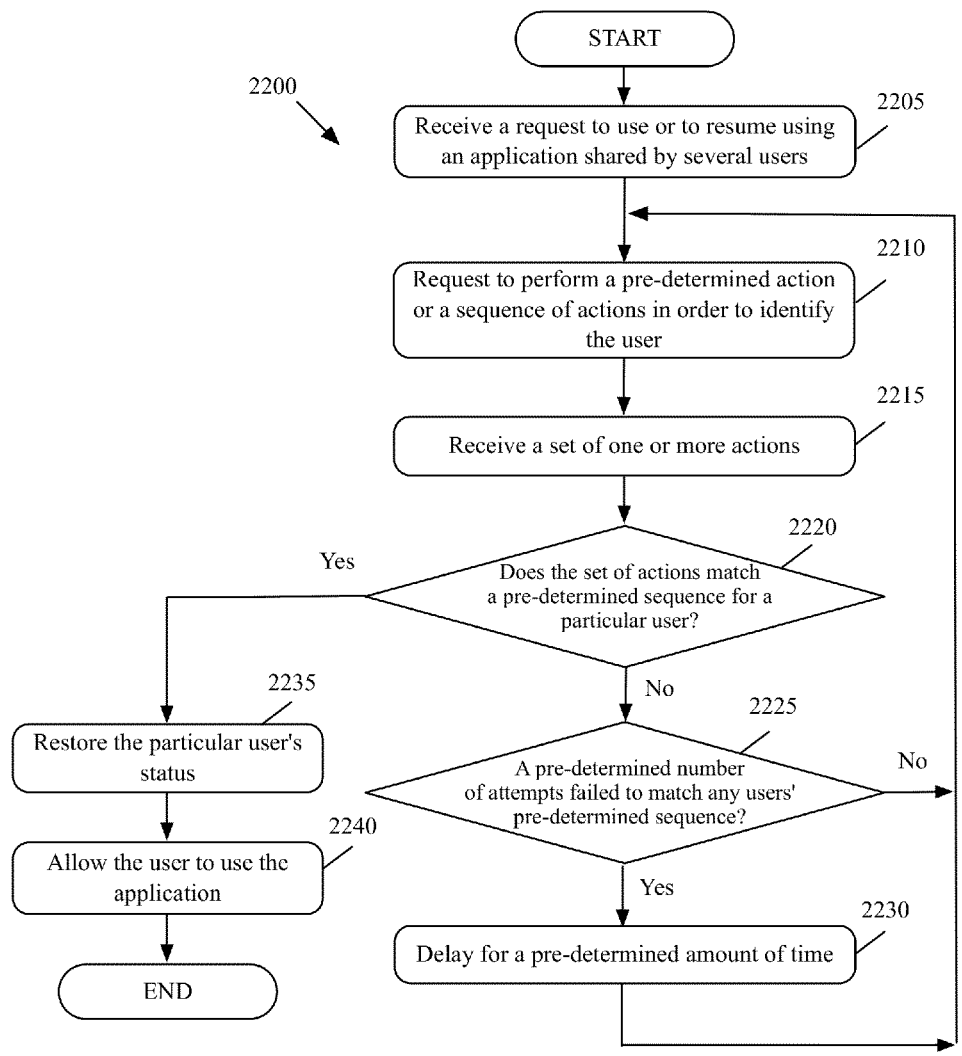
FIG. 22 conceptually illustrates a process for gaining quick access to a relatively low security account in some embodiments of the invention.

FIG. 22 conceptually illustrates a process 2200 for gaining quick access to a relatively low security account in some embodiments of the invention. For instance, the process is used in some embodiments where several users are using the same device for taking a test, taking a private lesson, playing a game, etc., and the participants take turn in using the device to use an application. Process 2200 is utilized in these embodiments to quickly identify each participant by having each participant to perform a few gestures or device movements in order to gain access to the application. Once a participant is identified, the participant continues using the application from where the participant left. As such, one difference between process 2200 and process 1900 is that process 2200 does not require a user identification or account identification for authorizing access rather Process 2200 identifies one out of several users that are already authorized to use an application and the individual users are identified in order to restore their saved status, e.g., to keep their scores, keep a history of their interactions with an application, enable them to start from where they had left, etc.

As shown, the process receives (at 2205) a request to use or resume using an application that is shared by several users. For instance, a participant taps on a touchscreen, shakes the device, selects a link, selects an icon or control to access or resume accessing an application. The process then requests (at 2210) the user to perform a pre-determine action or sequence of actions to identify himself/herself.

The process then receives (at 2215) a sequence of one or more actions. The process then determines (at 2220) whether the received sequence matches a pre-determined sequence associated to a particular user. If yes, the process restores (at 2235) the particular user's status (or resets the status if the user has just started to use the application). The process then allows (at 2240) the user to use the application. The process then exits.

Otherwise, if a received sequence does not match a sequence associated with any users, the process determines (at 2225) whether a pre-determined number of attempts to perform the sequence have failed. If not, the process proceeds to 2210, which was described above. Otherwise, the process delays (at 2230) for a pre-determined amount of time and then proceeds back to 2210.

B. Software Architecture

Figure 23A:
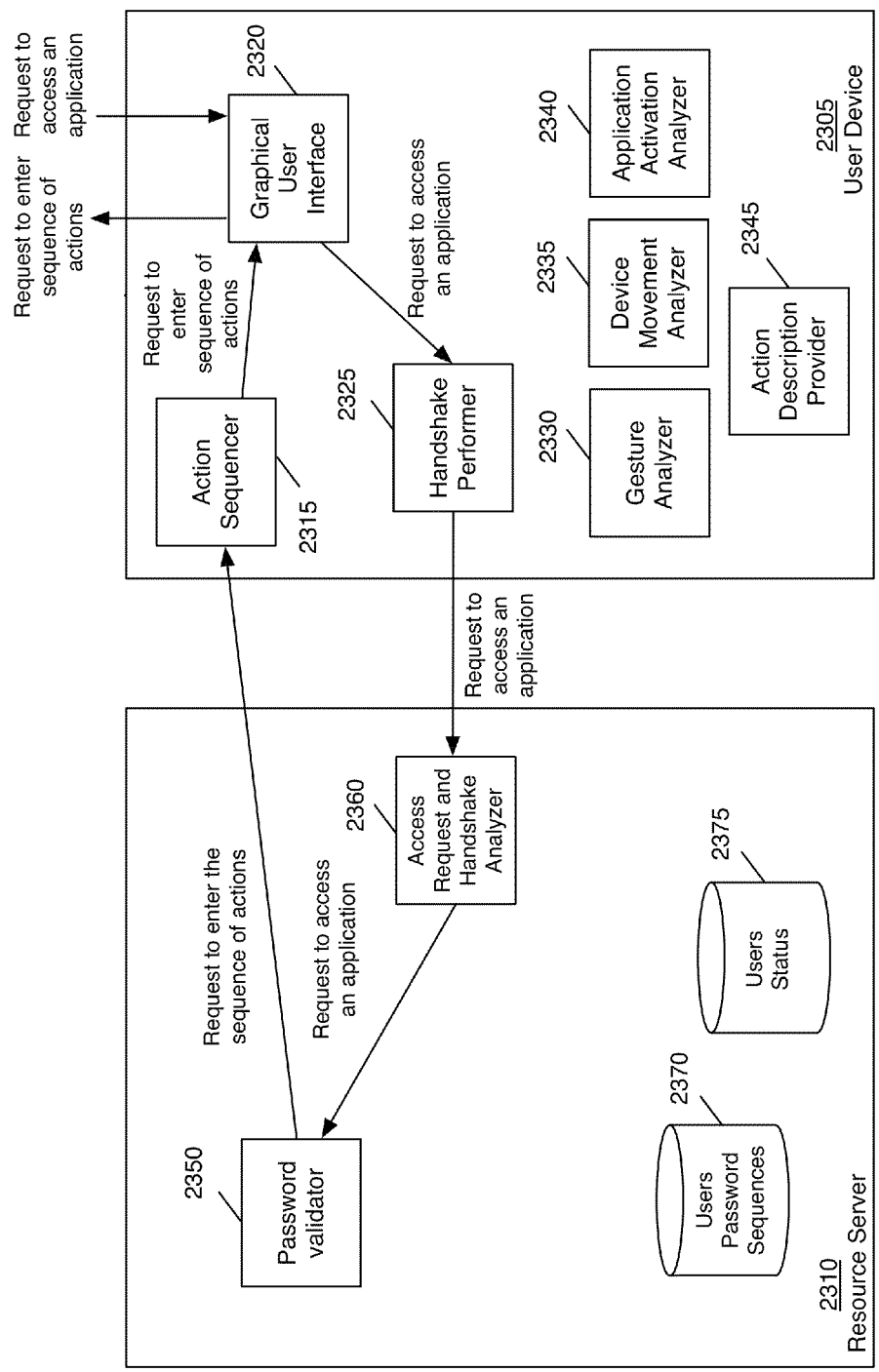
FIGS. 23A and 23B conceptually illustrate portions of a high-level software architecture of some embodiments.
Figure 23B:
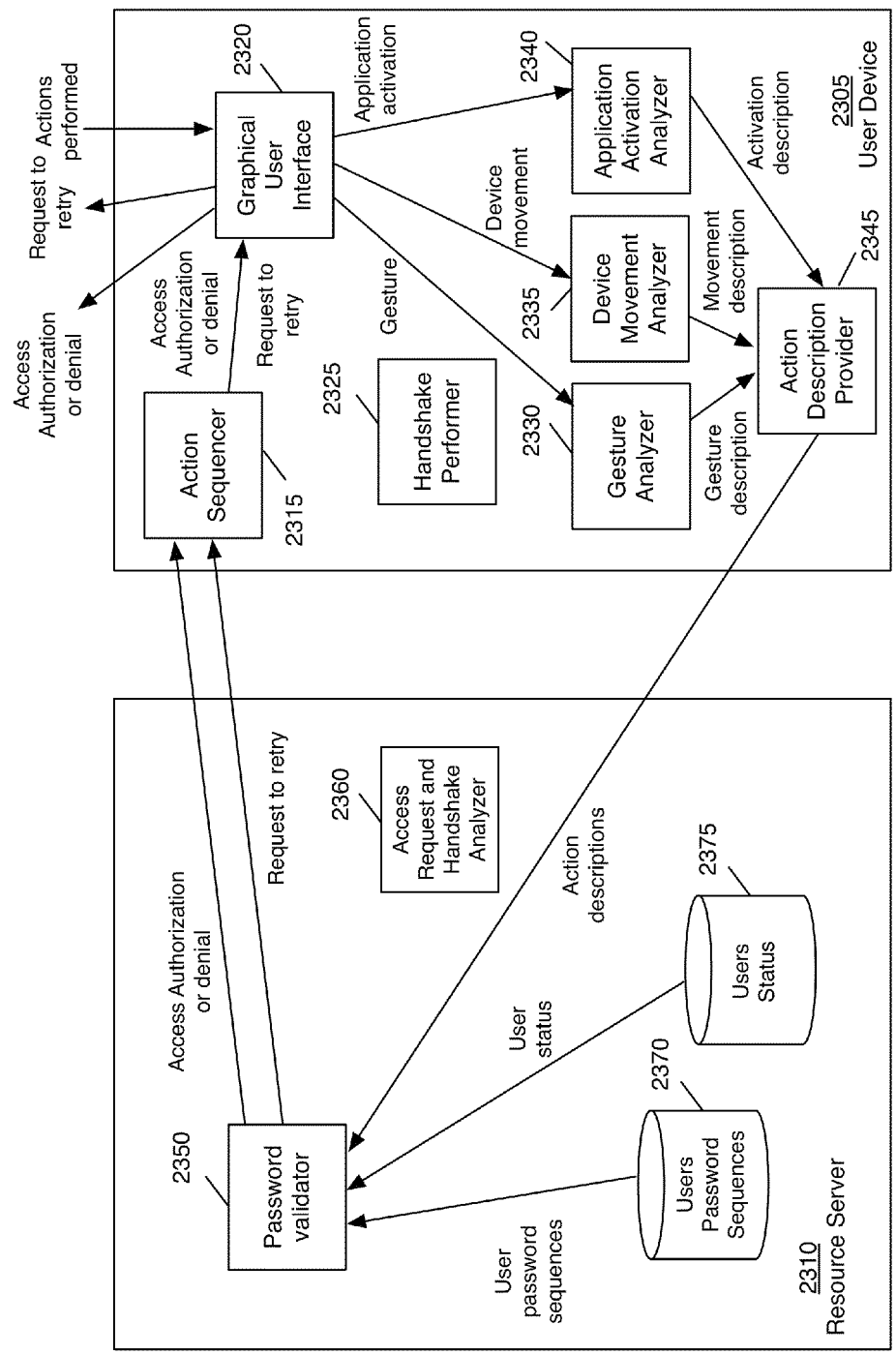

FIGS. 23A and 23B conceptually illustrate portions of a high-level software architecture of some embodiments. Some of the operations of processes 100 and 2200 as well as different operations shown in user interfaces for utilizing gestures and device movements to identify a user from a group of users sharing a resource are performed by one or more modules in FIGS. 23A and 23B. As shown, the user device 2305 includes the following modules: action sequencer 2315, graphical user interface 2320, handshake performer 2325, gesture analyzer 2330, device movement analyzer 2335, application activation analyzer 2340, and action description provider 2345. The resource server includes the following modules: password validator 2350 and access request and handshake analyzer 2360. The resource server 2310 also includes storage for storing users password sequences 2370 and status 2375 of each user that is sharing an application.

One of ordinary skill in the art would recognize that the modules shown in FIG. 23A and FIG. 23B are specific to the process for utilizing gestures and device movements for user authentication in some embodiments and that user devices and resource servers of some embodiments include numerous additional modules which are not shown in this figure.

As shown in FIG. 23A, the graphical user interface 2320 receives different user inputs including request to access an application or a resource shared by several users. The graphical user interface 2320 forwards the request to handshake performer module 2325. In some embodiments, handshake performer module is a part of another application such as a browser (not shown) running on the user device. The handshake performer module 2325 sends the request to access request and handshake analyzer module 2360 of the resource server 2310.

The access request and handshake analyzer module 2360 forwards the request to password validator module 2350. Password validator module 2350 sends a request to enter the sequence of actions that was established as the password to action sequencer module 2315 of the user device 2305. The action sequencer module 2315 sends the request to the graphical user interface 2320 module to display to the user.

As shown in FIG. 23B, the graphical user interface 2320 receives actions performed by the user and sends different actions such as gestures, device movements, and application activation to gesture analyzer 2330, device movement analyzer 2335, and application activation analyzer 2340 modules respectively. Gesture analyzer 2330, device movement analyzer 2335, and application activation analyzer 2340 modules analyze the received actions and prepare a description of each action and send them to action description provider 2345 module.

Action description provider 2345 module sends the action descriptions to password validator 2350 module of the resource server 2310, which determines whether the sequence of actions matches the sequence of actions stored for any users. The password validator 2350 module uses the received sequence and compares it with the users password sequences 2370. If the sequence performed matches a user's password, the user's previous status is restores from users status storage 2375 and an access authorization is sent to the action sequencer 2315 of the user device, which in turn sends to the graphical user interface 2320 to display to the user (or simply to allow the user the access to the requested application without displaying a confirmation). If the sequence did not match any of the stored passwords and a pre-determined number of retrials had also failed, the password validator sends an access denial to the user device. If a pre-determined number of attempts to perform a requested sequence have not been done, password validator 2365 sends a request to retry to action sequencer 2315 module of the user device.

The action sequencer 2315 sends the request to graphical user interface module 2320 to display to the user. The actions performed by the user are processed as described by reference to FIG. 23A, above and the process repeats until the sequence performed matches the user password or the number of attempts exceeds the number of allowed attempts.

Although the user device 2305 and the resource server 2310 are shown as separate entities, the resource server is in some embodiments a part of the user device (e.g., the resource server is an application running on the user device). In these embodiments, some of the modules, e.g., handshake performer 2325 and access request and handshake analyzer 2360 are not required since all modules reside on the same device.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs.

Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 24:
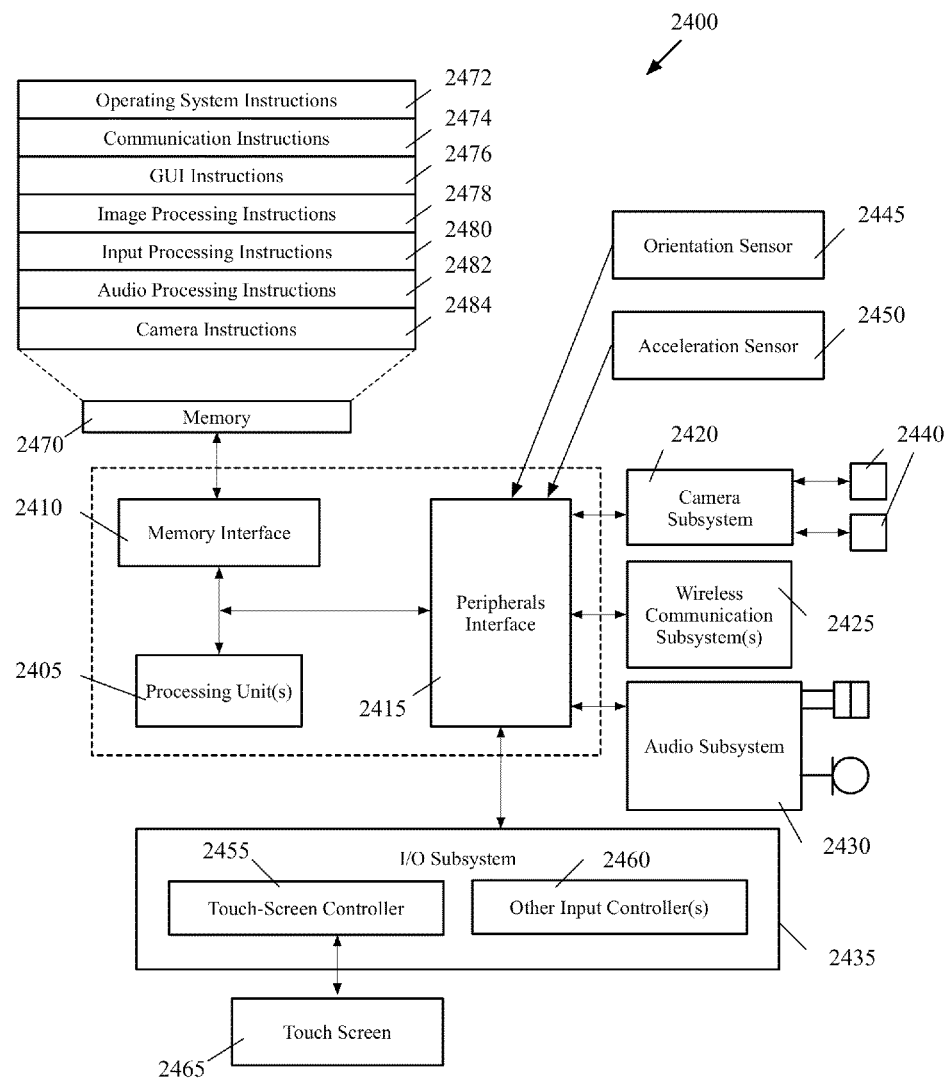
FIG. 24 is an example of an architecture of a mobile computing device in some embodiments of the invention.

The applications of some embodiments operate on mobile devices, such as smart phones (e.g., iPhones®) and tablets (e.g., iPads®). FIG. 24 is an example of an architecture 2400 of such a mobile computing device. Examples of mobile computing devices include smartphones, tablets, laptops, etc. As shown, the mobile computing device 2400 includes one or more processing units 2405, a memory interface 2410 and a peripherals interface 2415.

The peripherals interface 2415 is coupled to various sensors and subsystems, including a camera subsystem 2420, a wireless communication subsystem(s) 2425, an audio subsystem 2430, an I/O subsystem 2435, etc. The peripherals interface 2415 enables communication between the processing units 2405 and various peripherals. For example, an orientation sensor 2445 (e.g., a gyroscope) and an acceleration sensor 2450 (e.g., an accelerometer) are coupled to the peripherals interface 2415 to facilitate orientation and acceleration functions.

The camera subsystem 2420 is coupled to one or more optical sensors 2440 (e.g., a charged coupled device (CCD) optical sensor, a complementary metal-oxide-semiconductor (CMOS) optical sensor, etc.). The camera subsystem 2420 coupled with the optical sensors 2440 facilitates camera functions, such as image and/or video data capturing. The wireless communication subsystem 2425 serves to facilitate communication functions. In some embodiments, the wireless communication subsystem 2425 includes radio frequency receivers and transmitters, and optical receivers and transmitters (not shown in FIG. 24). These receivers and transmitters of some embodiments are implemented to operate over one or more communication networks such as a GSM network, a Wi-Fi network, a Bluetooth network, etc. The audio subsystem 2430 is coupled to a speaker to output audio (e.g., to output user-specific questions for generating the escrow key). Additionally, the audio subsystem 2430 is coupled to a microphone to facilitate voice-enabled functions, such as voice recognition (e.g., for searching), digital recording, etc.

The I/O subsystem 2435 involves the transfer between input/output peripheral devices, such as a display, a touch screen, etc., and the data bus of the processing units 2405 through the peripherals interface 2415. The I/O subsystem 2435 includes a touch-screen controller 2455 and other input controllers 2460 to facilitate the transfer between input/output peripheral devices and the data bus of the processing units 2405. As shown, the touch-screen controller 2455 is coupled to a touch screen 2465. The touch-screen controller 2455 detects contact and movement on the touch screen 2465 using any of multiple touch sensitivity technologies. The other input controllers 2460 are coupled to other input/control devices, such as one or more buttons. Some embodiments include a near-touch sensitive screen and a corresponding controller that can detect near-touch interactions instead of or in addition to touch interactions.

The memory interface 2410 is coupled to memory 2470. In some embodiments, the memory 2470 includes volatile memory (e.g., high-speed random access memory), non-volatile memory (e.g., flash memory), a combination of volatile and non-volatile memory, and/or any other type of memory. As illustrated in FIG. 24, the memory 2470 stores an operating system (OS) 2472. The OS 2472 includes instructions for handling basic system services and for performing hardware dependent tasks.

The memory 2470 also includes communication instructions 2474 to facilitate communicating with one or more additional devices; graphical user interface instructions 2476 to facilitate graphic user interface processing; image processing instructions 2478 to facilitate image-related processing and functions; input processing instructions 2480 to facilitate input-related (e.g., touch input) processes and functions; audio processing instructions 2482 to facilitate audio-related processes and functions; and camera instructions 2484 to facilitate camera-related processes and functions. The instructions described above are merely exemplary and the memory 2470 includes additional and/or other instructions in some embodiments. For instance, the memory for a smartphone may include phone instructions to facilitate phone-related processes and functions. Additionally, the memory may include instructions for a keychain backup or restoration application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 24 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 24 may be split into two or more integrated circuits.

B. Computer System

Figure 25:
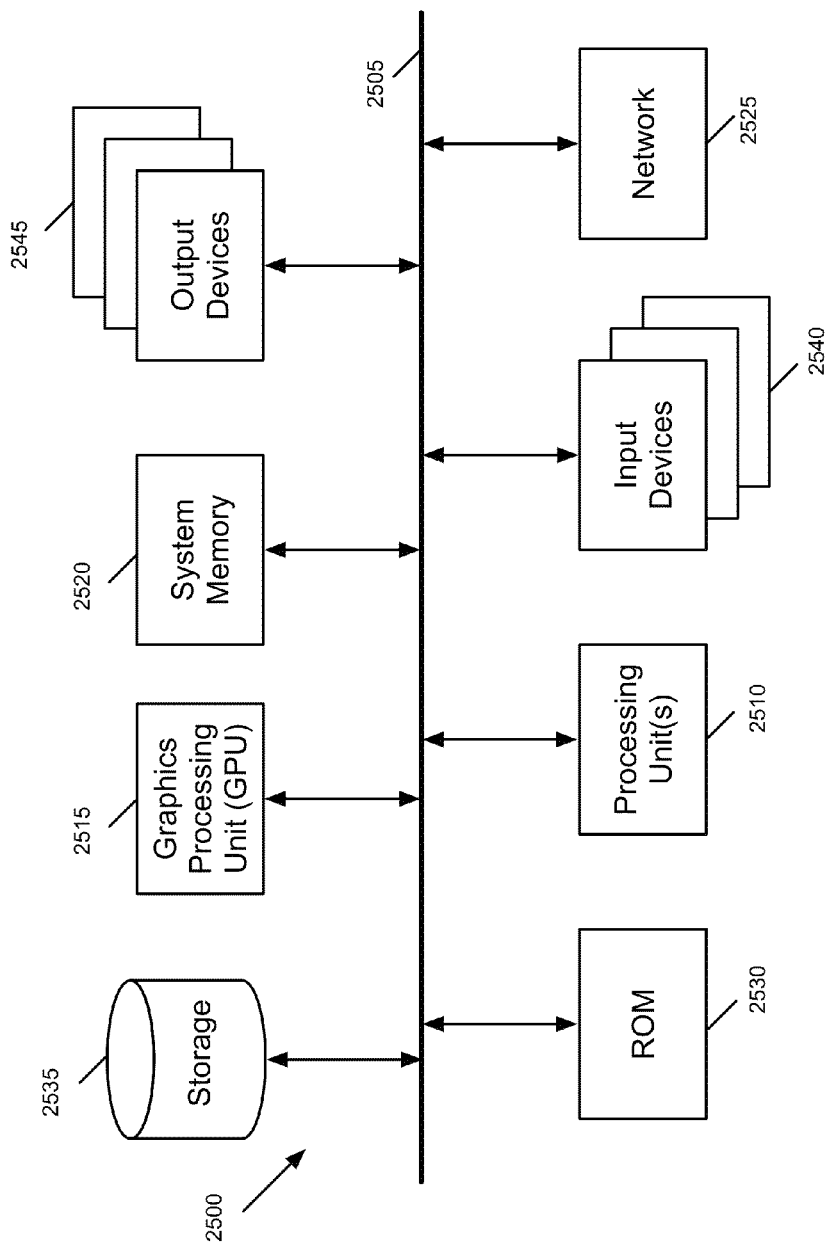
FIG. 25 conceptually illustrates an electronic system with which some embodiments of the invention are implemented.

FIG. 25 conceptually illustrates an electronic system 2500 with which some embodiments of the invention are implemented. The electronic system 2500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2500 includes a bus 2505, processing unit(s) 2510, a graphics processing unit (GPU) 2515, a system memory 2520, a network 2525, a read-only memory 2530, a permanent storage device 2535, input devices 2540, and output devices 2545.

The bus 2505 collectively represents all system, peripheral, and chipset buses that communicatively connect the numerous internal devices of the electronic system 2500. For instance, the bus 2505 communicatively connects the processing unit(s) 2510 with the read-only memory 2530, the GPU 2515, the system memory 2520, and the permanent storage device 2535.

From these various memory units, the processing unit(s) 2510 retrieves instructions to execute and data to process in order to execute the processes of the invention. The processing unit(s) may be a single processor or a multi-core processor in different embodiments. Some instructions are passed to and executed by the GPU 2515. The GPU 2515 can offload various computations or complement the image processing provided by the processing unit(s) 2510.

The read-only-memory (ROM) 2530 stores static data and instructions that are needed by the processing unit(s) 2510 and other modules of the electronic system. The permanent storage device 2535, on the other hand, is a read-and-write memory device. This device is a non-volatile memory unit that stores instructions and data even when the electronic system 2500 is off. Some embodiments of the invention use a mass-storage device (such as a magnetic or optical disk and its corresponding disk drive) as the permanent storage device 2535.

Other embodiments use a removable storage device (such as a floppy disk, flash memory device, etc., and its corresponding disk drive) as the permanent storage device. Like the permanent storage device 2535, the system memory 2520 is a read-and-write memory device. However, unlike storage device 2535, the system memory 2520 is a volatile read-and-write memory, such a random access memory. The system memory 2520 stores some of the instructions and data that the processor needs at runtime. In some embodiments, the invention's processes are stored in the system memory 2520, the permanent storage device 2535, and/or the read-only memory 2530. For example, the various memory units include instructions for processing multimedia clips in accordance with some embodiments. From these various memory units, the processing unit(s) 2510 retrieves instructions to execute and data to process in order to execute the processes of some embodiments.

The bus 2505 also connects to the input and output devices 2540 and 2545. The input devices 2540 enable the user to communicate information and select commands to the electronic system. The input devices 2540 include alphanumeric keyboards and pointing devices (also called "cursor control devices"), cameras (e.g., webcams), microphones or similar devices for receiving voice commands, etc. The output devices 2545 display images generated by the electronic system or otherwise output data. The output devices 2545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 25, bus 2505 also couples electronic system 2500 to a network 2525 through a network adapter (not shown). In this manner, the computer can be a part of a network of computers (such as a local area network ("LAN"), a wide area network ("WAN"), or an Intranet, or a network of networks, such as the Internet. Any or all components of electronic system 2500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 2, 12, 19, and 22) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for determining whether an input received at an electronic device is generated by a user thereof or by an automated software executing thereon, the method comprising:

identifying a set of capabilities of the electronic device for detecting a plurality of actions, wherein each action of the plurality of actions is a particular touch input gesture, a software application activation, or a particular movement that the electronic device is capable of identifying;

based on the set of capabilities, generating a set of actions to be carried out by the user, wherein each action in the set of actions is associated with an accuracy threshold, and the accuracy threshold is based on an associated capability level of a hardware component that is included in the electronic device and configured to detect each action in the set of actions;

causing the electronic device to prompt the user to attempt carrying out each action in the set of actions;

receiving, from the electronic device, first input results gathered in response to prompting the user to attempt carrying out the set of actions;

establishing, based on the first input results, a subset of actions that includes fewer actions than the set of actions, wherein, for each action in the subset of actions, the accuracy threshold associated with the action is not satisfied; and in response to establishing:
reducing the accuracy threshold associated with each action in the subset of actions based on the associated capability level of the hardware component,
causing the electronic device to prompt the user to reattempt carrying out each action in the subset of actions,
receiving, from the electronic device, second input results gathered in response to prompting the user to reattempt carrying out each action in the subset of actions, and
analyzing both the first input results and the second input results to determine whether the set of actions and the subset of actions were carried out by the user or by the automated software.

2. The method of claim 1, further comprising:
based on analyzing both the first input results and the second input results, determining that at least one action in the subset of actions was not successfully carried out;
based on the set of capabilities, generating a different set of actions to be carried out by the user;
causing the electronic device to prompt the user to carry out the different set of actions;
receiving, from the electronic device, subsequent input results gathered in response to prompting the user to carry out the different set of actions; and
analyzing the subsequent input results to determine whether the different set of actions was carried out by the user or by the automated software.

3. The method of claim 1, wherein the electronic device includes a touchscreen, and the set of actions includes at least one touch-based gesture to be carried out on the touchscreen.

4. The method of claim 3, wherein carrying out the touch-based gesture comprises touching the touchscreen at a particular number of points.

5. The method of claim 3, wherein carrying out the touch-based gesture comprises touching the touchscreen to establish a touch point and moving the touch point at a particular speed.

6. The method of claim 3, wherein carrying out the touch-based gesture comprises touching the touchscreen to establish a touch point and moving the touch point in a particular direction.

7. The method of claim 3, wherein carrying out the touch-based gesture comprises carrying out at least two of: (i) touching the touchscreen at a particular number of points, (ii) touching the touchscreen to establish a first touch point and moving the first touch point in a particular direction, and (iii) touching the touchscreen to establish a second touch point and moving the second touch point in a particular direction.

8. The method of claim 1, wherein the set of capabilities of the electronic device comprises a capability to detect at least one of a rotation, tilting, shaking, and an orientation change between portrait and landscape.

9. The method of claim 1, wherein the set of capabilities of the electronic device comprises a capability to detect at least one of a flash activation, a camera activation, and a voice pitch.

10. The method of claim 1, wherein the set of capabilities of the electronic device comprises the electronic device having one or more of a touchscreen, a magnetometer, an accelerometer, a gyroscope, a camera, a flash, and a microphone.

11. The method of claim 1, wherein the accuracy thresholds are further reduced based on a number of times that the set of actions or the subset of actions is not satisfied.

12. A non-transitory computer-readable medium storing instructions that, when executed by a processor included in an electronic device, cause the electronic device to determine whether an input received at the electronic device is generated by a user thereof or by an automated software executing thereon, by carrying out steps that include:
identifying a set of capabilities of the electronic device for detecting a plurality of actions, wherein each action of the plurality of actions is a particular touch input gesture, a software application activation, or a particular movement that the electronic device is capable of identifying;
based on the set of capabilities, generating a set of actions to be carried out by the user, wherein each action in the set of actions is associated with an accuracy threshold, and the accuracy threshold is based on an associated capability level of a hardware component that is included in the electronic device and configured to detect each action in the set of actions;
causing the electronic device to prompt the user to attempt carrying out each action in the set of actions;
receiving, from the electronic device, first input results gathered in response to prompting the user to attempt carrying out the set of actions;
establishing, based on the first input results, a subset of actions that includes fewer actions than the set of actions, wherein, for each action in the subset of actions, the accuracy threshold associated with the action is not satisfied; and
in response to establishing:
reducing the accuracy threshold associated with each action in the subset of actions based on the associated capability level of the hardware component,
causing the electronic device to prompt the user to reattempt carrying out each action in the subset of actions,
receiving, from the electronic device, second input results gathered in response to prompting the user to reattempt carrying out each action in the subset of actions, and
analyzing both the first input results and the second input results to determine whether the set of actions and the subset of actions were carried out by the user or by the automated software.

13. The non-transitory computer-readable medium of claim 12, further comprising:
based on analyzing both the first input results and the second input results, determining that at least one action in the subset of actions was not successfully carried out;
based on the set of capabilities, generating a different set of actions to be carried out by the user;
causing the electronic device to prompt the user to carry out the different set of actions;
receiving, from the electronic device, subsequent input results gathered in response to prompting the user to carry out the different set of actions; and
analyzing the subsequent input results to determine whether the different set of actions was carried out by the user or by the automated software.

14. The non-transitory computer-readable medium of claim 12, wherein the set of actions comprises gestures that include at least one of (i) touching a touchscreen of the electronic device at a particular number of points, (ii) touching the touchscreen to establish a first touch point and moving the first touch point in a particular direction, and (iii) touching the touchscreen to establish a second touch point and moving the second touch point in a particular direction.

15. The non-transitory computer-readable medium of claim 12, wherein the set of capabilities comprises at least one of a rotation, tilting, shaking, and an orientation change between portrait and landscape.

16. The non-transitory computer-readable medium of claim 12, wherein the set of capabilities comprise a capability to detect at least one of a flash activation, a camera activation, and a voice pitch detection.

17. The non-transitory computer-readable medium of claim 12, wherein the accuracy thresholds are further reduced based on a number of times that the set of actions or the subset of actions is not satisfied.

18. A system for determining whether an input received at an electronic device is generated by a user thereof or by an automated software executing thereon, the system comprising:
the electronic device; and
a server, wherein the server includes a processor that is configured to carry out steps that include:
identifying a set of capabilities of the electronic device for detecting a plurality of actions, wherein each action of the plurality of actions is a particular touch input gesture, a software application activation, or a particular movement that the electronic device is capable of identifying;
based on the set of capabilities, generating a set of actions to be carried out by the user, wherein each action in the set of actions is associated with an accuracy threshold, and the accuracy threshold is based on an associated capability level of a hardware component that is included in the electronic device and configured to detect each action in the set of actions;
causing the electronic device to prompt the user to attempt carrying out each action in the set of actions;
receiving, from the electronic device, first input results gathered in response to prompting the user to attempt carrying out the set of actions;
establishing, based on the first input results, a subset of actions that includes fewer actions than the set of actions, wherein, for each action in the subset of actions, the accuracy threshold associated with the action is not satisfied; and
in response to establishing:
reducing the accuracy threshold associated with each action in the subset of actions based on the associated capability level of the hardware component,
causing the electronic device to prompt the user to reattempt carrying out each action in the subset of actions,
receiving, from the electronic device, second input results gathered in response to prompting the user to reattempt carrying out each action in the subset of actions, and
analyzing both the first input results and the second input results to determine whether the set of actions and the subset of actions were carried out by the user or by the automated software.

19. The system of claim 18, wherein the processor is further configured to:
based on analyzing both the first input results and the second input results, determining that at least one action in the subset of actions was not successfully carried out;
based on the set of capabilities, generating a different set of actions to be carried out by the user;
causing the electronic device to prompt the user to carry out the different set of actions;
receiving, from the electronic device, subsequent input results gathered in response to prompting the user to carry out the different set of actions; and
analyzing the subsequent input results to determine whether the different set of actions was carried out by the user or by the automated software.

20. The system of claim 18, wherein the set of actions comprises gestures that include at least one of (i) touching a touchscreen of the electronic device at a particular number of points, (ii) touching the touchscreen to establish a first touch point and moving the first touch point in a particular direction, and (iii) touching the touchscreen to establish a second touch point and moving the second touch point in a particular direction.

21. The system of claim 18, wherein the set of capabilities comprises a capability to detect at least one of a rotation, tilting, shaking, and an orientation change between portrait and landscape.

22. The system of claim 18, wherein the accuracy thresholds are further reduced based on a number of times that the set of actions or the subset of actions is not satisfied.

* * * * *